US012646305B2

(12) United States Patent
Shirsat et al.

(10) Patent No.: US 12,646,305 B2
(45) Date of Patent: Jun. 2, 2026

(54) SYSTEMS AND METHODS FOR PROBABILISTIC CONSENSUS ON FEATURE DISTRIBUTION FOR MULTI-ROBOT SYSTEMS WITH MARKOVIAN EXPLORATION DYNAMICS

(71) Applicants:Aniket Shirsat, Tempe, AZ (US);
Spring Berman, Scottsdale, AZ (US);
Shatadal Mishra, Tempe, AZ (US);
Wenlong Zhang, Chandler, AZ (US)

(72) Inventors: Aniket Shirsat, Tempe, AZ (US);
Spring Berman, Scottsdale, AZ (US);
Shatadal Mishra, Tempe, AZ (US);
Wenlong Zhang, Chandler, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 304 days.

(21) Appl. No.: 18/244,912

(22) Filed: Sep. 11, 2023

(65) Prior Publication Data
US 2024/0096073 A1     Mar. 21, 2024

Related U.S. Application Data

(60) Provisional application No. 63/375,160, filed on Sep. 9, 2022.

(51) Int. Cl.
*G06V 10/80* (2022.01)
*B64U 10/14* (2023.01)
(Continued)

(52) U.S. Cl.
CPC ........... *G06V 10/806* (2022.01); *B64U 10/14* (2023.01); *G05D 1/104* (2013.01); *G06V 10/85* (2022.01);
(Continued)

(58) Field of Classification Search
CPC ...... G06V 10/806; G06V 10/85; G06V 20/17; B64U 10/14; B64U 2101/30; G05D 1/104;
(Continued)

(56) References Cited

U.S. PATENT DOCUMENTS

2018/0012370 A1*   1/2018 Aghamohammadi ......................
                                                         G06F 18/251
2018/0165544 A1*   6/2018 Isert ........................ G06T 17/10
(Continued)

OTHER PUBLICATIONS

Shirsat et al. "Multi-Robot Target Search using Probabilistic Consensus on Discrete Markov Chains" p. 108-115 dated 2020 (Year: 2020).*

(Continued)

*Primary Examiner* — Ming Y Hon
(74) *Attorney, Agent, or Firm* — Polsinelli PC

(57) ABSTRACT

A consensus-based decentralized multi-robot approach is presented for reconstructing a discrete distribution of features, modeled as an occupancy grid map, that represent information contained in a bounded planar 2D environment, such as visual cues used for navigation or semantic labels associated with object detection. The robots explore the environment according to a random walk modeled by a discrete-time discrete-state (DTDS) Markov chain and estimate the feature distribution from their own measurements and the estimates communicated by neighboring robots, using a distributed Chernoff fusion protocol. Under this decentralized fusion protocol, each robot's feature distribution converges to the ground truth distribution in an almost sure sense.

14 Claims, 15 Drawing Sheets

(51) Int. Cl.

| | |
|---|---|
| *G05D 1/00* | (2024.01) |
| *G06V 10/84* | (2022.01) |
| *G06V 20/17* | (2022.01) |
| *H04W 4/46* | (2018.01) |
| *B64U 101/30* | (2023.01) |

(52) U.S. Cl.
CPC .............. *G06V 20/17* (2022.01); *H04W 4/46* (2018.02); *B64U 2101/30* (2023.01)

(58) Field of Classification Search
CPC .. G05D 1/243; G05D 1/2464; G05D 2105/87; G05D 2109/254; G05D 2111/10; G05D 1/6983; H04W 4/46
See application file for complete search history.

(56) References Cited

U.S. PATENT DOCUMENTS

| | | | | |
|---|---|---|---|---|
| 2021/0103290 | A1* | 4/2021 | Pajovic | G05D 1/0287 |
| 2024/0100702 | A1* | 3/2024 | Saunders | G05B 19/41895 |

OTHER PUBLICATIONS

Abdulgalil et al. "Multi-robot SLAM: An Overview and Quantitative Evaluation of MRGS ROS Framework for MR-SLAM", p. 165-183 dated 2019 (Year: 2019).*

Gunay et al. "Chernoff Fusion of Gaussian Mixtures Based on Sigma-Point Approximation" p. 2731-2746 dated 2016 (Year: 2016).*

Lehrer et al. "Log-Linear Chernoff Fusion for Distributed Particle Filtering" dated 2019 (Year: 2019).*

Bailey, Tim; "Dn conservative fusion of information with unknown non-gaussian dependence," in Proc. 15th Int. Conf. Inf. Fusion, 2012, pp. 1876-1883.

Battistelli, Giorgio and Luigi Chisci; "Kullback-leibler average, consensus on prob-ability densities, and distributed state estimation with guaranteed stability," Automatica, vol. 50, No. 3, pp. 707-718, 2014.

Burgard, Wolfram, et al., , "Coordinated multi-robot exploration," IEEE Trans. Robot., vol. 21, No. 3, pp. 376-386, Jun. 2005.

Calafiore, Giuseppe C. and Fabrizio Abrate; "Distributed linear estimation over sensor networks," Int. J. Control, vol. 82, No. 5, pp. 868-882, 2009.

Degroot, Morris H., "Reaching a consensus," J. Amer. Stat. Assoc., vol. 69, No. 345, pp. 118-121, 1974.

Farrell, William J. III and Ganesh Chidambar; "Generalized chernoff fusion approximation for practical distributed data fusion," in Proc. Int. Conf. Inf. Fusion, 2009, pp. 555-562.

Howard, A., Parker, L.E., and Sukhatme, G.S.; "Experiments with a large heterogeneous mobile robot team: Exploration, mapping, deployment and detection," Int. J. Robot. Res., vol. 25, No. 5/6, pp. 431-447, 2006.

Husain, et al., "Mapping planetary caves with an autonomous, heterogeneous robot team," in Proc. IEEE Aerosp. Conf., 2013, pp. 1-13.

Kegeleirs, Miquel and David Garzon, "Random walk exploration for swarm mapping," in Towards Auton. Robot. Syst., 2019, pp. 211-222.

Levin, David A., Yuval Peres, and Elizabeth L. Wilmer; Markov Chains and Mixing Times, vol. 107. Providence, RI, USA: Amer. Math. Soc., 2017.

Li, et al., "Fully distributed consensus control for linear multiagent systems: A reduced-order adaptive feedback approach," IEEE Trans. Control Netw. Syst., vol. 7, No. 2, pp. 967-976, Jun. 2020.

Mahdoui, Nesrine, Vincent Fremont, and Enrico Natalizio; "Cooperative frontier-based exploration strategy for multi-robot system," in Proc. IEEE 13th Annu. Conf. Syst. Syst. Eng., 2018, pp. 203-210.

Mendoca, R., et al., Graph Theoretic Methods in Multiagent Systems. Princeton, NJ, USA: Princeton Univ., 2010.

Mishra, Shatadal and Wenlong Zhang; "A disturbance observer approach with online Q-filter tuning for position control of quadcopters," in Proc. Amer. Control Conf., 2017, pp. 3593-3598.

Mishra, Shatadal, et al., "Robust attitude control for quadrotors based on parameter optimization of a nonlinear disturbance observer," J. Dyn. Syst., Meas., Control, vol. 141, No. 8, Mar. 2019.

Mishra, Shatadal, et al., "Autonomous vision-guided object collection from water surfaces with a customized multi-rotor," IEEE/ASME Trans. Mechatronics, vol. 26, No. 4, pp. 1914-1922, Aug. 2021.

Olfati-Saber, Reza and Richard M. Murray, "Consensus problems in networks of agents with switching topology and time-delays," IEEE Trans. Autom. Control, vol. 49, No. 9, pp. 1520-1533, Sep. 2004.

Polya, G., "Tiber eine aufgabe der wahrscheinlichkeitsrechnung betreffend die irrfahrt im straBennetz," Mathematische Annalen, vol. 84, No. 1, pp. 149-160, 1921.

Ren, Wei and Randal W. Beard, "Consensus of information under dynamically changing interaction topologies," in Proc. Amer. Control Conf., vol. 6, 2004, pp. 4939-4944.

Shirsat, Aniket, Karthik Elamvazhuthi, and Spring Berman; "Multi-robot target search using probabilistic consensus on discrete Markdv chains," in Proc. IEEE Int. Symp. Safety, Secur., Rescue Robot., 2020, pp. 108-115.

Shirsat, Aniket and Spring Berman, "Decentralized multi-target tracking with multiple quadrotors using a PHD filter," in Proc. Amer. Inst. Aeronaut. Astronaut. Scitech 2021 Forum, 2021.

Sukkar, Fouad, Graeme Best, Chanyeol Yoo, and Robert Fitch; "Multi-robot region-of-interest reconstruction with Dec-MCTS," in Proc. IEEE Int. Conf. Robot. Automat., 2019, pp. 9101-9107.

Wang, Li, Aaron D. Ames, and Magnus Egerstedt; "Safe certificate-based maneuvers for teams of quadrotors using differential flatness," in Proc. IEEE Int. Conf. Robot. Automat., 2017, pp. 3293-3298.

Wei, Baishen and Brett Nener, "Consensus labeled multi-bernoulli filtering for distributed space debris tracking," in Proc. Int. Conf. Control, Automat. Inf. Sci., 2017, pp. 203-208.

Xia, Weiguo, Ming Cao, and Karl Henrik Johansson; "Structural balance and opinion separation in trust-mistrust social networks," IEEE Trans. Control Netw. Syst., vol. 3, No. 1, pp. 46-56, Mar. 2016.

Nagatani, K., et al., "Emergency response to the nuclear accident at the fukushima daiichi nuclear power plants using mobile rescue robots," J. Field Robot., vol. 30, No. 1, pp. 44-63, 2013.

Furrer, F., et al., RotorS—A Modular Gazebo MAV Simulator Framework. Cham, Switzerland: Springer, 2016, pp. 595-625.

Mesbahi, M. and M. Egerstedt, "Graph Theoretic Methods in Multiagent Systems",. Princeton, NJ, USA: Princeton Univ., 2010. (Book only).

Grimmett, G. and D. Stirzaker, Probability and Random Processes. New York, NY, USA: Dxford Univ. Press, 2001. (Book only).

Horn, A.R. and C.R. Johnson, Matrix Analysis. Cambridge, U.K.: Cam-bridge Univ. Press, 1990. (Book only).

Hintjens, P., ZeroMQ: Messaging for Many Applications. Sebastopol, CA, USA: D.Reilly Media, Inc., 2013. (Book only).

Elamvazhuthi, K. et al., "Controllability and Stabilization for Herding a Robotic Swarm Using a Leader: A Mean-Field Approach," IEEE Transactions on Roboic, vol. 37, No. 2, Apr. 2, 2021, pp. 418-432.

\* cited by examiner

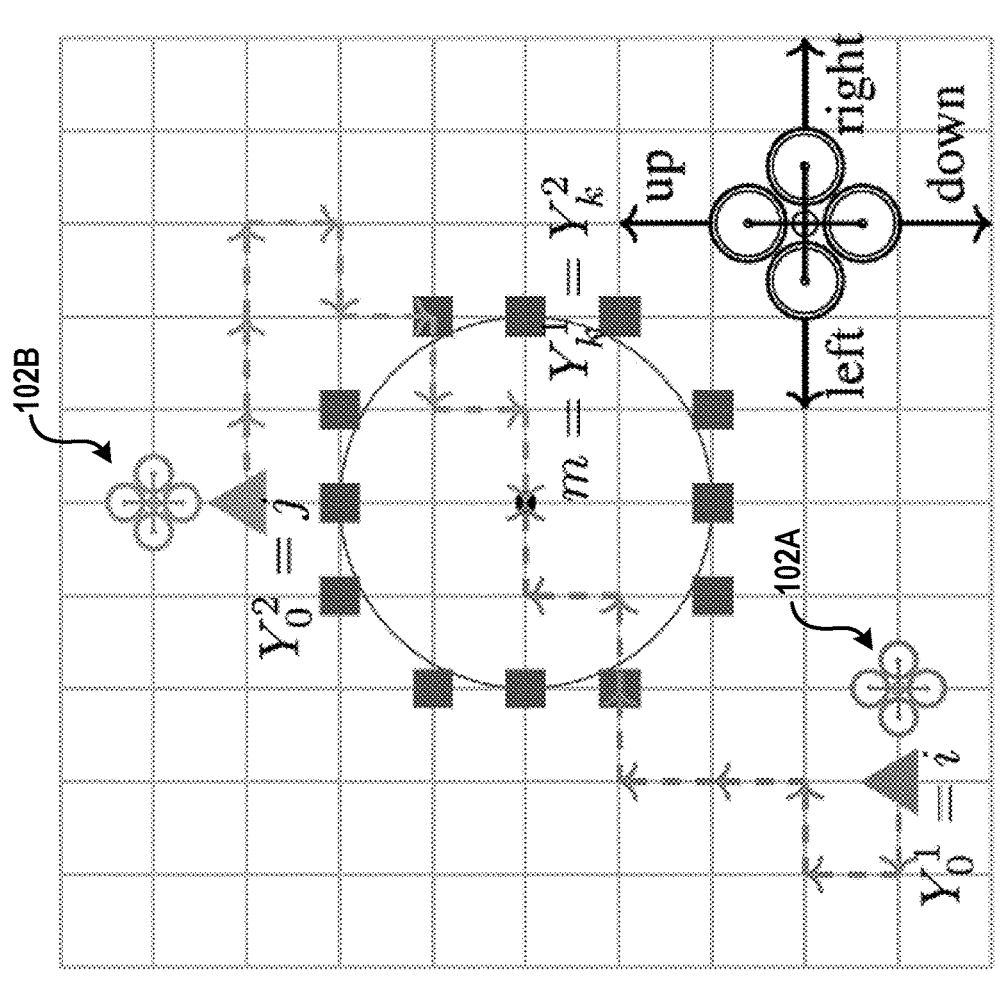
FIG. 1A

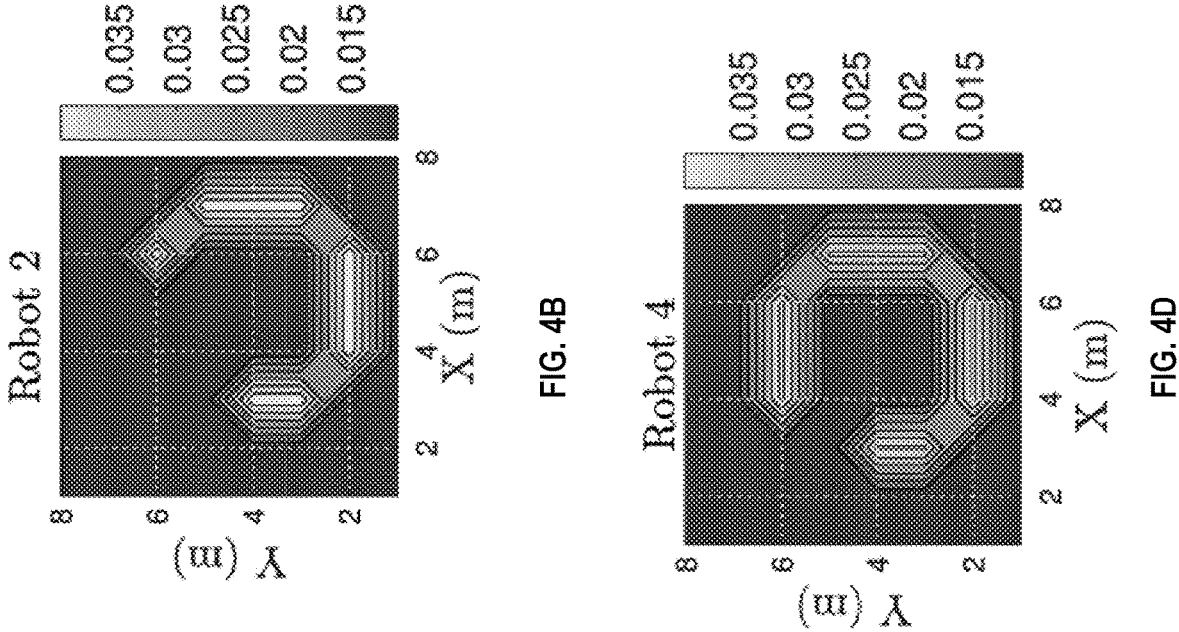
FIG. 4A
FIG. 4B
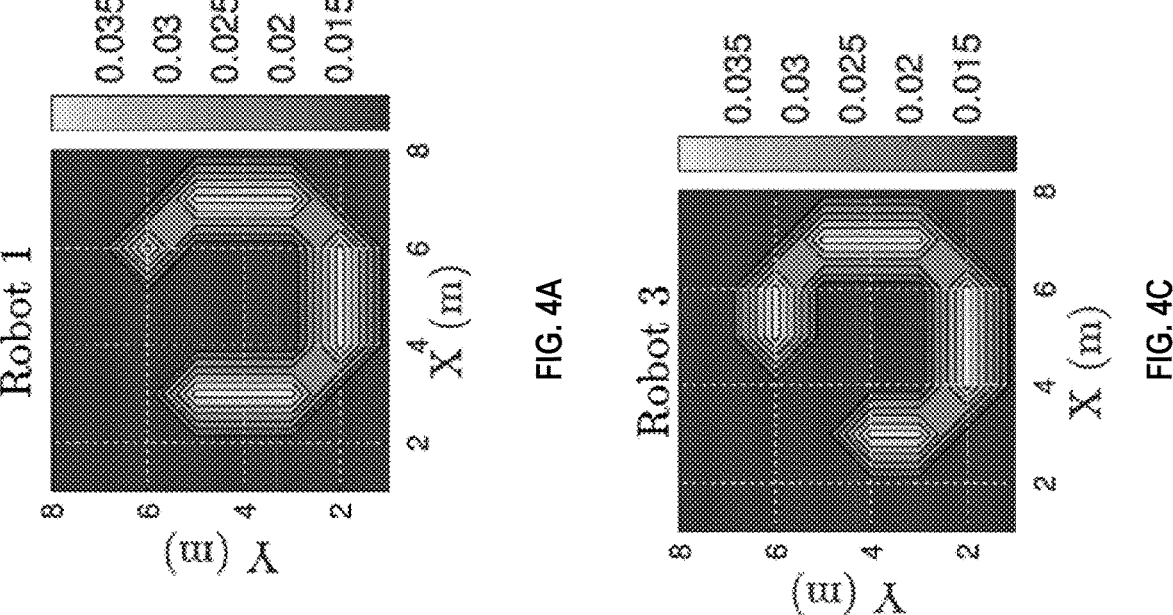
FIG. 4C
FIG. 4D

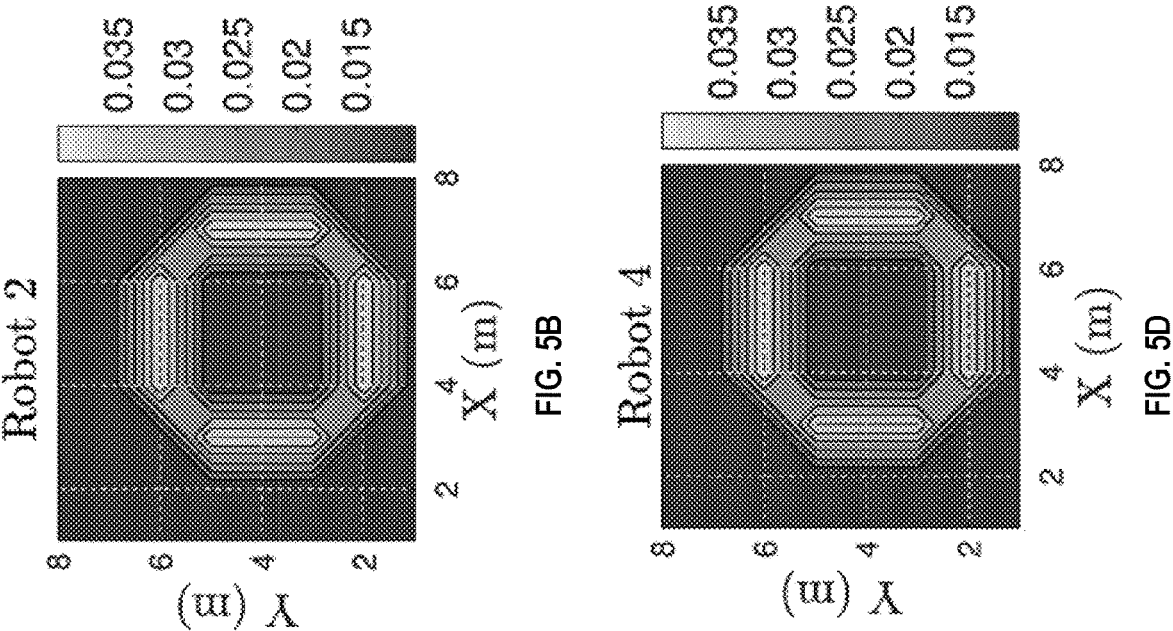
FIG. 5A
FIG. 5B
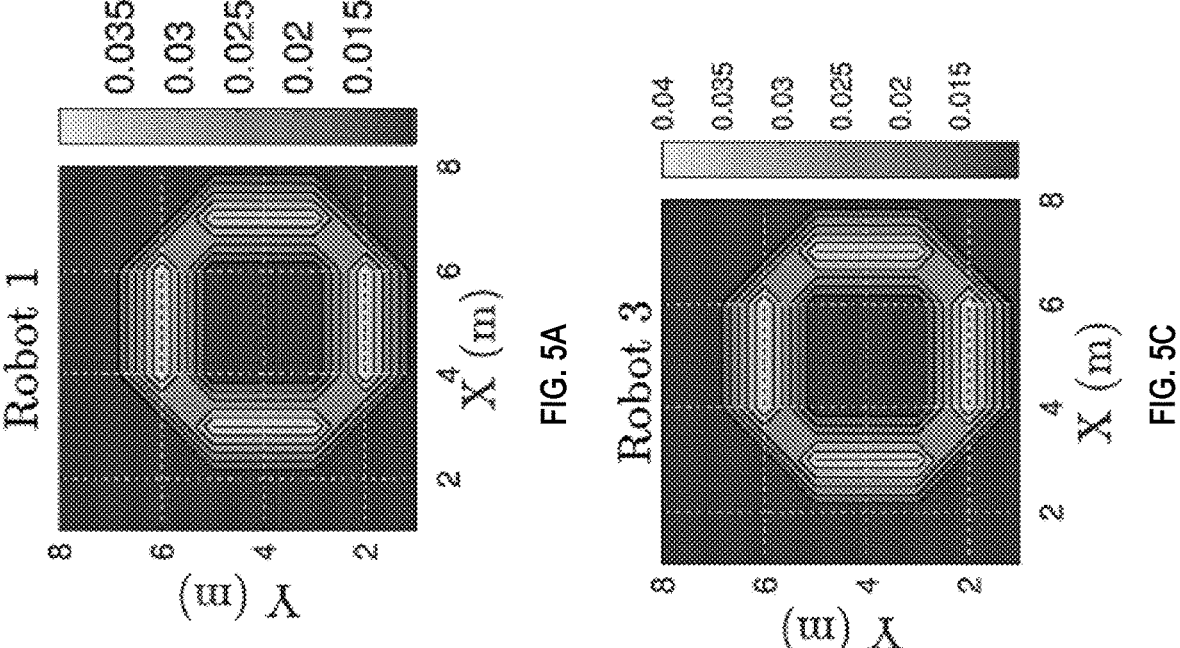
FIG. 5C
FIG. 5D

SYSTEMS AND METHODS FOR PROBABILISTIC CONSENSUS ON FEATURE DISTRIBUTION FOR MULTI-ROBOT SYSTEMS WITH MARKOVIAN EXPLORATION DYNAMICS

CROSS-REFERENCE TO RELATED APPLICATIONS

This is a U.S. Non-Provisional Patent Application that claims benefit to U.S. Provisional Patent Application Ser. No. 63/375,160 filed 9 Sep. 2022, which is herein incorporated by reference in its entirety.

FIELD

The present disclosure generally relates to robot-aided exploration, and in particular, to a system and associated methods for combining occupancy map estimates by robots in a multi-robot system (MRS) tasked with exploring an unknown but bounded finite environment according to a probabilistic search strategy.

BACKGROUND

Multi-robot systems (MRS) composed of multiple mobile robots have been used for various collective exploration and perception tasks, such as mapping unknown environments, disaster response, and surveillance and monitoring, herding a group of robots. The performance of MRS in such applications is constrained by the capabilities of the payloads that the robots can carry on-board, including the power source, sensor suite, computational resources, and communication devices for transmitting information to other robots and/or a central node. These constraints are particularly restrictive in the case of small aerial robots such as multi-rotors that perform vision-guided tasks.

It is with these observations in mind, among others, that various aspects of the present disclosure were conceived and developed.

BRIEF DESCRIPTION OF THE DRAWINGS

FIG. 1A is a graphical representation of a multi-robot exploration strategy, showing sample paths for two quadrotors on a square grid;

FIGS. 4A-4D are a series of graphical representations showing feature PMFs of four robots at time k=240 s in the numerical simulation;

FIGS. 5A-5D are a series of graphical representations showing feature PMFs of four robots at time k=500 s in the numerical simulation;

FIGS. 14A and 14B are a pair of process flow diagrams showing a method for consensus-based feature distribution estimation by the system of FIGS. 1A-1C.

Corresponding reference characters indicate corresponding elements among the view of the drawings. The headings used in the figures do not limit the scope of the claims.

DETAILED DESCRIPTION

I. Introduction

Centralized MRS strategies for exploration and mapping, such as the next-best-view planning method, rely on constant communication between all the robots and a central node. Scaling up such strategies with the number of robots requires expanding the communication infrastructure and preventing communication failures of the central node. Frontier-based MRS exploration strategies rely on a dynamic communication topology in which leaders are responsible for coordinating the team.

Decentralized MRS exploration and mapping strategies that employ only local communication alleviate these drawbacks and are designed to work robustly under inter-robot communication bandwidth constraints and disruptions to communication links by environmental effects. Many decentralized MRS estimation strategies are designed to achieve consensus among the robots on a particular variable or property of interest through local inter-robot communication. For example, distributed consensus-based approaches have been designed for spacecraft attitude estimation and space debris tracking. Consensus behaviors also arise in social networks when users reach an agreement on a shared opinion in a distributed fashion. Consensus strategies have been developed for MRS communication networks that are static or dynamic, and that can be represented as directed or undirected graphs, as well as random networks and networks with communication delays. However, few works address consensus problems for MRS that follow random mobility models, often used in MRS exploration strategies whose communication networks exhibit Markovian switching dynamics as a result. Random exploration strategies have certain advantages for MRS: they do not require centralized motion planning, localization, or communication, and they can be modified to produce more focused or more dispersed coverage.

In previous works, a probabilistic consensus-based strategy was developed for target search by MRS with a discrete-time discrete-state (DTDS) Markov motion model and local sensing and communication. Using this strategy, the robots are guaranteed to achieve consensus almost surely on the presence of a static feature of interest, without any requirements on the connectivity of the robots' communication network. This approach is extended to an MRS strategy for tracking multiple static features by formulating the tracking procedure as a renewal-reward process on the underlying Markov chain. The robots reach a consensus on the number of features and their locations in a decentralized manner using a Gaussian Mixture approximation of the Probability Hypothesis Density (PHD) filter.

Figure 1B:
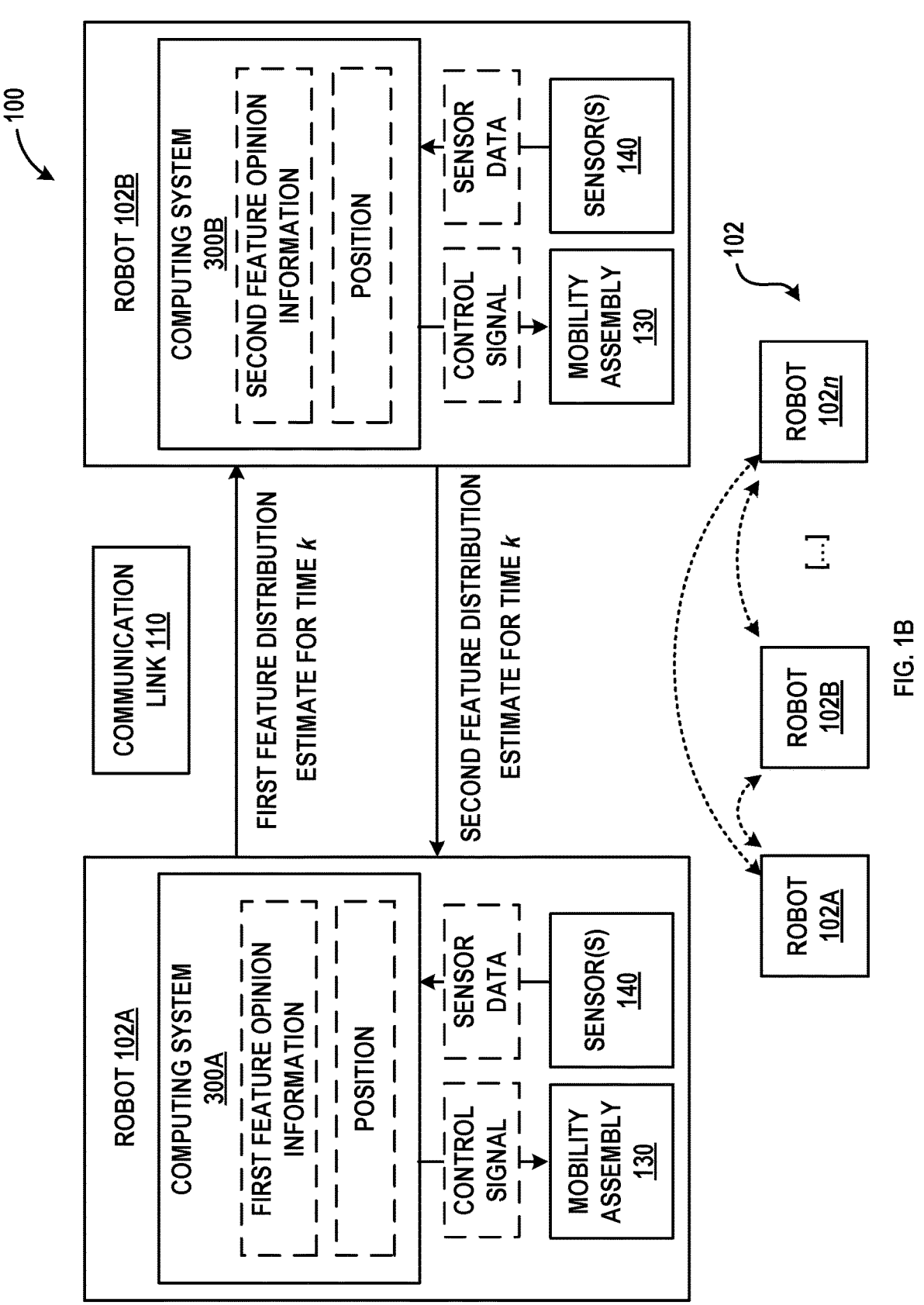
FIG. 1B is a simplified diagram showing a multi-robot system for estimating a discrete distribution of features within an environment while searching for features according to the exploration strategy of FIG. 1A.
Figure 1C:
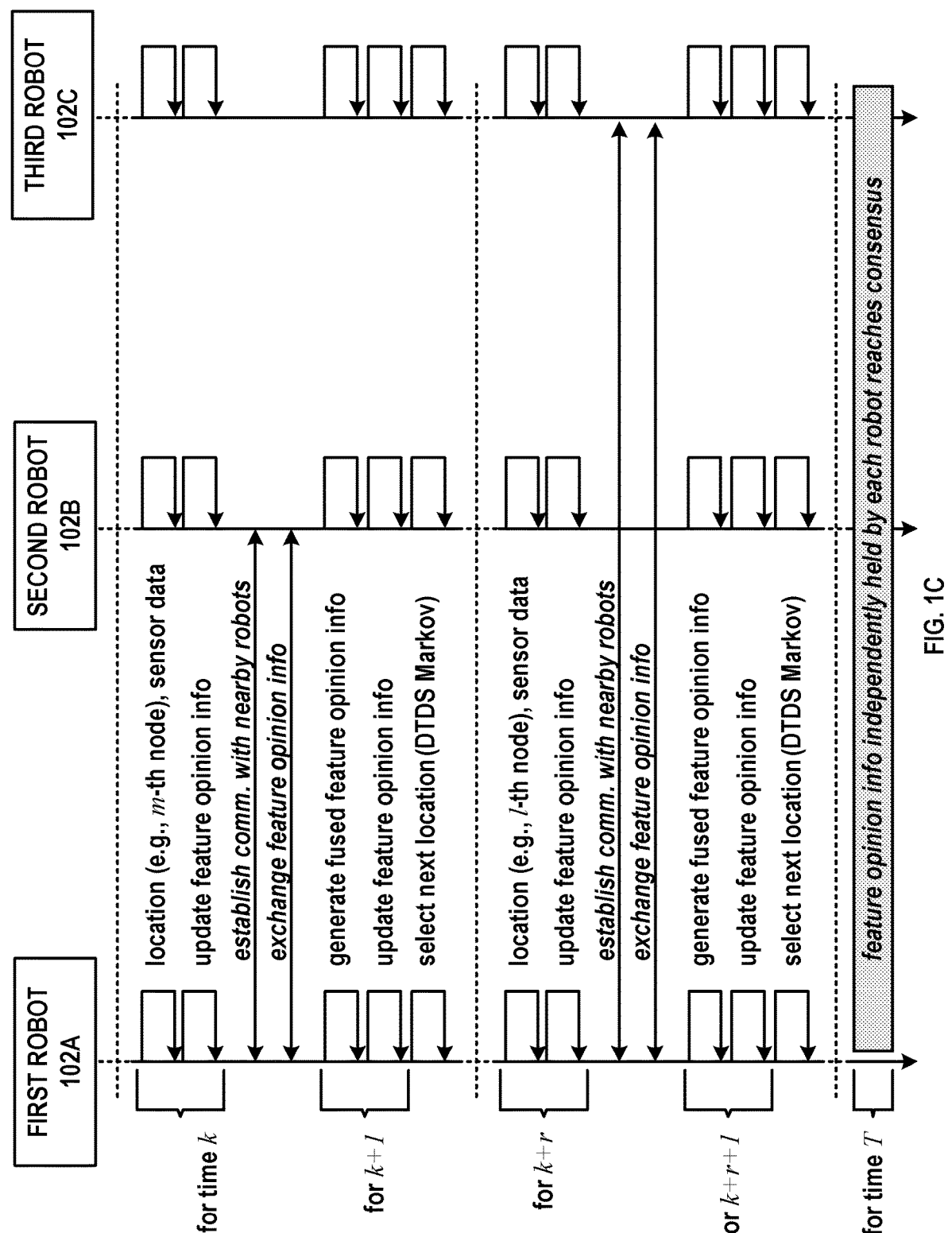
FIG. 1C is a simplified sequence diagram showing communication between robots of the multi-robot system of FIG. 113.

This disclosure provides a probabilistic multi-robot search strategy that achieves consensus on a discrete distribution of static features, modeled as an occupancy grid map, using results on opinion pools. As shown in FIGS. 1A-1C, a system 100 includes a plurality of robots 102 each having a mobility assembly 130, one or more sensors 140, and a communication module (e.g., a network interface such as network interface 310 shown in FIG. 15) operable for establishing a communication link 110 between other robots 102 within a communication range. Note that the communication range does not need to cover an entire area that is being explored, nor does each individual robot 102 need to be able to always communicate with every other robot 102. The strategies outlined herein enable the robots 102 to communicate with one another and exchange opinions whenever they encounter one another along a Markovian random walk within the area. At each encounter, the robots 102 update their respective opinions based on the information exchanged during the encounter, e.g., by a distributed Chernoff fusion protocol that fuses respective opinions held by the robots 102. At a final time step, the opinions held by the robots 102 reach a consensus; this is shown in a proof (Section IV) as well as with validation studies (Sections V, VI) presented herein. Further, each respective robot 102 can include a computing system 300 including a processor and a memory (see FIG. 15). In the example of FIG. 1B, the plurality of robots can include a first robot 102A, a second robot 102B . . . an n$^{th}$ robot 102n; as such, the first robot 102A can include a first computing system 300A and the second robot 102B can include a second computing system 300B.

The plurality of robots 102 move according to a DTDS Markov chain on a finite 2D spatial grid (e.g., the environment) and can detect features present within the environment using sensor(s) 140 onboard each respective robot 102. The strategy is distributed and asynchronous, and it preserves the required communication bandwidth by relying only on local inter-robot communication. The main contributions of this disclosure are as follows:

The system 100 implementing a decentralized, stochastic multi-robot exploration and mapping strategy in which the plurality of robots 102 use a consensus protocol, without communication connectivity requirements, to arrive at a common reconstruction of a feature distribution on a 2D grid. Specifically, given the plurality of robots 102 that move within an area according to a DTDS Markov motion model and use local sensing and communication, if the plurality of robots 102 update their estimates of the feature distribution with those of other plurality of robots 102 according to a distributed Chernoff fusion protocol, then they will reach consensus almost surely on the ground truth distribution. This extends previous results on opinion consensus over fixed, strongly connected networks to networks with Markovian switching dynamics.

Theoretical results are validated in numerical simulations that illustrate the pathwise convergence to zero of the Hellinger distance between each robot's estimate of the feature distribution and the ground truth distribution. The present approach is also validated in Software-In-The-Loop (SITL) simulations of quadrotors (e.g., a specific type of robot), performed in Gazebo using the Robot Operating System (ROS) with the PX4 autopilot.

The remainder of the disclosure is organized as follows. The probabilistic exploration strategy and information fusion protocol are presented in Section II. Relevant properties of DTDS Markov chains are described in Section III, and derivation of the main result that guarantees the convergence of each robot's feature distribution to the ground truth distribution is provided in Section IV. The results of numerical simulations are presented in Section V and the results of SITL simulations are presented in Section VI.

II. Exploration and Information Fusion Strategy

Consider a bounded square environment (e.g., an area) $\mathcal{B} \subset \mathbb{R}^2$ with sides of length B. $\mathcal{B}$ is discretized into a square grid of nodes spaced at a distance $\delta$ apart. The set of nodes is denoted by $\mathcal{S} \subset \mathbb{Z}_+$, and S=$|\mathcal{S}|$. A set of N robots (e.g., the plurality of robots 102), $\mathcal{A} = \{1, 2, \ldots, N\}$, each modeled as a point mass, explore the environment by performing a Markovian random walk on the grid, assuming that there are no obstacles in the environment that impede motion of the robots 102. Let $\mathcal{G}_s = (\mathcal{V}_s, \mathcal{E}_s)$ be an undirected graph associated with this finite spatial grid, where $\mathcal{V}_s = \mathcal{S}$ is the set of nodes and E is the set of edges (i,j). The edges signify pairs of nodes i,j$\in \mathcal{V}_s$, called neighboring nodes, between which robots can travel. Assume that the robots 102 can localize on $\mathcal{G}_s$.

Let $Y_k^a \in \mathcal{S}$ be a random variable that defines the node that robot a$\in \mathcal{A}$ (e.g., the first robot 102A) occupies at discrete time k. Robot a moves from its current node i to a neighboring node j at the next time step with a transition probability $p_{ij} \in [0, 1]$. $P \in \mathbb{R}^{S \times S}$ is the state transition matrix consisting of elements $p_{ij}$ at row i and column j. Let $\pi_k \in \mathbb{R}^{1 \times S}$ denote the probability mass function (PMF) of $$Y_k^a$$

for each robot a, or alternatively, a distribution of the robot population over the grid at time k. This distribution evolves over time according to a DTDS Markov chain model of order one, $$\pi_{k+1} = \pi_k P. \tag{1}$$

Assume that each robot 102 can exchange information with other robots that are within a communication radius $r_{comm} < 0.58$. Let $\mathcal{G}_c[k]=\mathcal{V}_c[k]=(V_c,\varepsilon_c[k])$ be an undirected graph in which $V_c=\mathcal{V}$ (the set of robots 102), and $\varepsilon_c[k]$ is the set of all pairs of robots $(a, b)\in \mathcal{A} \times \mathcal{A}$ that can communicate with each other at time k (where robot b can be considered the second robot 102B). Let $M[k]\in \mathbb{R}^{N \times N}$ be the adjacency matrix with elements $m_{ab}[k]=1$ if $(a, b)\in \varepsilon_c[k]$ and $m_{ab}[k]=0$ otherwise. For each robot $a\in \mathcal{A}$, the set of neighbors of robot a at time k is defined as $N_k^a \triangleq \{b\in \mathcal{A} :(a, b)\in \varepsilon_c[k]\}$.

A set of discrete features is distributed over the grid at nodes in the set $\mathcal{B}^r \subseteq \mathcal{S}$. The robots 102 know a priori that these features are present in the environment, but do not know their distribution. Assume that when a robot 102 is located at a node in $\mathcal{B}^r$, it can detect the presence of a feature at that node using its on-board sensors (e.g., sensor(s) 140). Each node in the grid is associated with a binary occupancy value, defined as $\bar{I}\in (0.5, 1)$ if the robot 102 detects a feature at that node and $1-\bar{I}$ if the robot 102 does not detect a feature at that node. Setting $\bar{I}\in (0.5, 1)$ helps produce sharp reconstructions of the features: as the value of $\bar{I}$ increases, the distinction between occupied and unoccupied nodes becomes clearer.

Each robot 102 holds and updates feature opinion information, which includes an occupancy vector for robot a at time k is defined as $$\bar{\theta}_k^a = [\theta_k^a(1) \ ... \ \theta_k^a(S)] \in \mathbb{R}^{1 \times S},$$

where:

$$\theta_k^a(s) = \begin{cases} \bar{I}, & s \in \mathcal{B}^r \text{(occupied)} \\ 1 - \bar{I}, & o.w \text{(unoccupied)} \end{cases} \tag{2}$$

The occupancy vector for each robot indicates its estimate of the nodes of the area that are occupied by features. The feature opinion information held by the robot 102 can be in the form of a feature PMF or occupancy distribution, estimated by robot a at time k from its own sensor measurements, where:

$$f_k^a(s) = \frac{\theta_k^a(s)}{\sum_{i\in \mathcal{S}} \theta_k^a(i)} \tag{3}$$

Here, $$f_k^a(s)$$

represents the opinion of robot a at time k for the occupancy distribution. $\theta^{ref}\in \mathbb{R}^{1 \times S}$ denotes a reference occupancy vector that is being estimated by all the robots, defined as follows:

$$\theta^{ref}(s) = \begin{cases} \bar{I}, & s \in \mathcal{B}^r \\ 1 - \bar{I}, & o.w \end{cases} \tag{4}$$

Since the robots 102 do not know the occupancy distribution a priori, the following specifies that they all initially consider the grid to be unoccupied, i.e., $$f_0^a(s) = \frac{1 - \bar{I}}{S(1 - \bar{I})}, a \in \mathcal{A}, \forall s \in \mathcal{S} \tag{5}$$

This is defined as a nominal distribution for all the robots 102, denoted by $$f^{nom}(s) = f_0^{(\cdot)}(s). \text{ A vector } \theta^{nom} \in \mathbb{R}^{1 \times S}$$

is defined as a nominal occupancy vector for all robots 102, which represents all nodes as unoccupied (i.e., $$\theta^{nom}(s) = \theta_0^{(\cdot)}(s) = 1 - \bar{I}, \forall s \in \mathcal{S}).$$

$f^{ref}(s)$ is defined as a reference PMF, which represents a ground truth feature distribution, corresponding to $\theta^{ref}(S)$.

A fusion weight $$\omega_k^{(a,b)}$$

is defined as the following Metropolis weight:

$$\omega_k^{(a,b)} = \begin{cases} \frac{1}{1 + [N_k^b]}, & b \in N_k^a \backslash \{a\} \\ 1 - \sum_{b\in N_k^a \backslash \{a\}} \omega_k^{(a,b)}, & a = b, a \in \mathcal{A} \\ 0, & o.w \end{cases} \tag{6}$$

Note that $$\omega_k^{(a,b)}$$

and $$\sum_{b\in N_k^a \backslash \{a\}} \omega_k^{(a,b)} = 1.$$

A consensus or opinion weighting matrix at time k is defined as $\Omega_k\in \mathbb{R}^{N \times N}$, which includes elements $$\omega_k^{(a,b)}$$

at row a and column b.

Given the robot exploration dynamics in Eq. (1), each respective robot a (e.g., first robot 102A) updates its opinion $$f_k^a(s),$$

computed from Eq. (3), to the following PMF $$f_{k+1}^{cher}(s)$$

at the next time step, which it computes using the opinions of other robots (e.g., second robot 102B and any others) within its communication range according to a distributed Chernoff fusion protocol.

$$f_{k+1}^{cher}(s) = \frac{\prod_{b \in \mathcal{N}_k^a \cup \{a\}} [f_k^b(s)]^{\omega_k^{(a,b)}}}{\sum_{s \in \mathcal{S}} \prod_{b \in \mathcal{N}_k^a \cup \{a\}} [f_k^b(s)]^{\omega_k^{(a,b)}}}, \ a \in \mathcal{A} \tag{7}$$

It can be proved that $$f_{k+1}^{cher}$$

is the local neighbor fused feature PMF at time k+1 of all robots $a \in \mathcal{A}$ that are in $\mathcal{N}_k^a$. When only two robots a, $b \in \mathcal{A}$ are within communication range (e.g., the first robot 102A and the second robot 102B), this update rule becomes:

$$f_{k+1}^{cher}(s) = \frac{[f_k^a(s)]^\omega [f_k^b(s)]^{1-\omega}}{\sum_{s \in \mathcal{S}} [f_k^a(s)]^\omega [f_k^b(s)]^{1-\omega}}, \tag{8}$$

where the Metropolis weight $$\omega \equiv \omega_k^{(a,b)}$$

is defined in Eq. (6). Then each robot a compares $$f_{k+1}^{cher}(s)$$

with $f^{nom}(s)$ to generate a new fused occupancy vector as follows:

$$\theta_{k+1}^{cher}(s) = \begin{cases} \overline{1} & f_{k+1}^{cher}(s) > f^{nom}(s), s \in \mathcal{S} \\ 1 - \overline{1} & o.w \end{cases} \tag{9}$$

The results of Eqs. (7)-(9) are referred to herein as fused feature opinion information. Then, each robot a generates a new occupancy vector $$\theta_{k+1}^a(s)$$

by comparing both its occupancy vector at the previous time step $$\theta_k^a(s),$$

and the fused occupancy vector $$\theta_{k+1}^{cher}(s),$$

to $\theta^{nom}(s)$:

$$\theta_{k+1}^a(s) = \begin{cases} \overline{1} & \theta_k^a(s) > \theta^{nom}(s) \text{ or } \theta_{k+1}^{cher}(s) > \theta^{nom}(s), s \in \mathcal{S} \\ \theta_k^a(s) & o.w \end{cases} \tag{10}$$

This new occupancy vector can be used to update the feature opinion information held by the associated robot 102 for the time step k+1.

The Hellinger metric, which measures the similarity between two PMFs, is used to quantify the convergence of each robot's feature distribution to the reference distribution. The Hellinger distance between the feature PMF $$f_k^a(s)$$

of a robot $a \in \mathcal{A}$ at time k and the reference PMF $f^{ref}(s)$ is given by:

$$D_H(f_k^a(s), f^{ref}(s)) = \sqrt{1 - \rho(f_k^a(s), f^{ref}(s))}, \tag{11}$$

Where $$\rho(f_i^a(s)), f^{ref}(s)$$

is the Bhattacharya coefficient, defined as:

$$\rho(f_k^a(s), f^{ref}(s)) = \sum_{s \in \mathcal{S}} \sqrt{f_k^a(s) \cdot f^{ref}(s)} \tag{12}$$

This distance takes values in [0,1]. The vector $$D_H \in \mathbb{R}_{\geq 0}^{N \times 1}$$

is defined with each entry $a \in \mathcal{A}$ given by $$D_H(f_k^a(s), f^{ref}(s)).$$

---

Algorithm 1: Distributed Chernoff Fusion Protocol for Robots a, b $\in \mathcal{A}$ Computed by Robot a at Time k

--- input : $f_k^a, f_k^b, Y_k^a, Y_k^b, k, T, \epsilon$ output : $f_k^\alpha$ if 1 < k ≤ T then -continued

---

Algorithm 1: Distributed Chernoff Fusion Protocol for
Robots a, b ∈ $\mathcal{A}$ Computed by Robot a at Time k

---

| If $Y_k^a = Y_k^b$ then
| | ω = 0.5
| else
| | ω = 1.0
| end
| $c = \sum_{s \in \mathcal{S}} [f_k^a(s)]^\omega \cdot [f_k^b(s)]^{1-\omega}$
| $\log f_{cher} = \omega \log(f_k^a) + (1-\omega)\log(f_k^b) - \log(c)$
| $f_{k+1}^a = f_{k+l}^{cher} = \exp(\log f_{cher})$ end

---

The pseudo code in Algorithm 1 above shows implementation of this fusion strategy for two robots a and b (e.g., the first robot 102A and the second robot 102B). In this algorithm, the normalizing constant c is the denominator of Eq. (8). The distributed Chernoff fusion protocol of Algorithm 1 can be implemented at the processor of the associated robot 102 in a logarithmic form for computational convenience.

FIG. 1A illustrates the proposed strategy for a scenario with two quadrotors (e.g., as the first robot 102A and the second robot 102B). The quadrotors start at the spatial grid nodes indexed by i and j and move on the grid according to the DTDS Markov chain dynamics in Eq. (1). The figure shows sample paths of the quadrotors. The second quadrotor detects the feature, indicated by a square, when it moves to a node in the set $\mathcal{B}^r$ (at these nodes, the feature is within the quadrotor's sensing range). The quadrotors meet at grid node m after k=9 time steps and fuse occupancy distributions according to Eq. (8). They continue to random-walk on the grid and update $$f_k^a(s)$$

until a specified final time T. A value of T was empirically selected based on feature PMF convergence times from numerical simulation studies, shown in FIG. 7, and on flight time constraints of off-the-shelf quadrotors. FIG. 1B shows components of the system 100 with focus on the exchange between the first robot 102A and the second robot 102B for time k.

FIG. 1C shows a sequence diagram illustrating communications between the first robot 102A and the second robot 102B for time k at node m, and further illustrating communications between the first robot 102A and a third robot 102C for time at another node l.

For time k, the first robot 102A is positioned at node m and captures sensor data. The first robot 102A updates first feature opinion information based on the sensor data that indicates its feature opinion for features observed by the first robot 102A within the area up until time k. Likewise, the second robot 102B updates second feature opinion information based on the sensor data that indicates its feature opinion for features observed by the second robot 102B within the area up until time k. The first feature opinion information held by the first robot 102A and the second feature opinion information held by the second robot 102B can include overlapping information about nodes they have both visited before time k. The first feature opinion information held by the first robot 102A can include information about nodes that the second robot 102B has not visited, and vice versa.

When within communication range (e.g., when the first robot 102A and the second robot 102B are at the same node m or are otherwise near one another), the first robot 102A and the second robot 102B establish a communication link (e.g., communication link 110 of FIG. 1B) with one another and exchange feature opinion information. In particular, the first robot 102A sends the first feature opinion information to the second robot 102B and the second robot 102B sends the second feature opinion information to the first robot 102A.

Once the first robot 102A receives the second feature opinion information and once the second robot 102B receives the first feature opinion information, they each generate fused feature opinion information by the distributed Chernoff fusion protocol of Algorithm 1 for time step k+1. The first robot 102A updates the first feature opinion information for time step k+1 based on the fused feature opinion information. Likewise, the second robot 102B updates the second feature opinion information for time step k+1 based on the fused feature opinion information. Following this, the first robot 102A selects a next location (e.g., node j) along the Markovian random walk. Likewise, the second robot 102B selects a next location along the Markovian random walk which is likely different from the location selected by the first robot 102A. In examples where a third robot 102C is also within communication range with the first robot 102A and the second robot 102B at time step k, the above process is similarly applied with the distributed Chernoff fusion protocol subject to (7) outlined above.

With continued reference to FIG. 1C, at a later time step k<(k+r)<T, the first robot 102A and the third robot 102C meet at or near node l. Similar to above pertaining to time step k, the first robot 102A holds first feature opinion information indicating observations of features along the path up to time step (k+r) and the third robot 102C holds third feature opinion information indicating observations of features along the path up to time step (k+r). The first feature opinion information can include information obtained by the first robot 102A from its encounter with the second robot 102B at time step k. The first feature opinion information held by the first robot 102A and the third feature opinion information held by the third robot 102C can include overlapping information about nodes they have both visited before time (k+r). The first feature opinion information held by the first robot 102A can also include information about nodes that the third robot 102C has not visited, and vice versa.

When within communication range (e.g., when the first robot 102A and the third robot 102C are at the same node l or are otherwise near one another), the first robot 102A and the third robot 102C establish a communication link (e.g., analogous to communication link 110 of FIG. 1B) with one another and exchange feature opinion information. In particular, the first robot 102A sends the first feature opinion information to the third robot 102C and the third robot 102C sends the third feature opinion information to the first robot 102A.

Once the first robot 102A receives the third feature opinion information and once the third robot 102C receives the first feature opinion information, they each generate fused feature opinion information by the distributed Chernoff fusion protocol of Algorithm 1 for time step (k+r+1). The first robot 102A updates the first feature opinion information for time step (k+r+1) based on the fused feature opinion information. Likewise, the third robot 102C updates the third feature opinion information for time step (k+r+1) based on the fused feature opinion information. Following this, the first robot 102A selects a next location along the Markovian random walk. Likewise, the third robot 102C selects a next location along the Markovian random walk which is likely different from the location selected by the first robot 102A. During this encounter, the second robot 102B can similarly interact with other robots or can simply update its own second feature opinion information if no other robots are available within communication range.

At a final time step T, the first feature opinion information held by the first robot 102A, the second feature opinion information held by the second robot 102B, and the third feature opinion information held by the third robot 102C (along with feature opinion information held by other robots 102 of the plurality of robots 102) reach a general consensus of the feature distribution within the area.

III. Properties of DTDS Markov Chains

The Markov chain in (1) is characterized in terms of the time-invariant state transition matrix P, which is defined by the state space of the spatial grid representing the discretized environment. Hence, the Markov chain is time-homogeneous which implies that $$Pr(Y_{k+1}^a = j | Y_k^a = i)$$

is the same for all robots 102 at all times k. The entries of P, which are the state transition probabilities, can therefore be defined as:

$$p_{ij} = Pr(Y_{k+1}^a = j | Y_k^a = i), \forall i, j \in S, k \in \mathbb{Z}_+, \forall a \in \mathcal{A} \quad (13)$$

Since each robot 102 chooses its next node from a uniform distribution, these entries can be computed as:

$$p_{ij} = \begin{cases} \dfrac{1}{d_i + 1} & (i, j) \in \mathcal{E}_s, \\ 0, & o.w, \end{cases} \quad (14)$$

where $d_i$ is the degree of the node $i \in S$, defined as $d_i=2$ if i is a corner node of the spatial grid, $d_i=3$ if it is on an edge between two corner nodes, and $d_i=4$ otherwise. Since each entry $p_{ij} \geq 0$, the notation $P \geq 0$. Note that $P^m \geq 0$ for $m \geq 1$, and therefore P is a non-negative matrix. P is a stochastic matrix. If TF is a stationary distribution of Markov chain (1), then $\forall k \in Z_+$, $$\pi P^k = \pi \quad (15)$$

From the construction of the Markov chain, each robot 102 has a positive probability of moving from any node $i \in S$ to any other node $j \in S$ of the spatial grid in a finite number of time steps. As a result, the Markov chain is irreducible, and therefore P is an irreducible matrix. There exists a real unique positive left eigenvector of P and since P is a stochastic matrix, its spectral radius $\rho(P)$ is 1. Therefore, this left eigenvector is the stationary distribution of the corresponding Markov chain. Since it is shown that the Markov chain is irreducible and has a stationary distribution $\pi$, which satisfies $\pi P = \pi$, one can conclude that the Markov chain is positive recurrent. Thus, all states in the Markov chain are positive recurrent, which implies that each robot 102 will keep visiting every state on the finite spatial grid infinitely often.

IV. Consensus on the Feature Distribution

Equation (8) achieves opinion consensus over a graph with a fixed and strongly connected topology. This result is extended to graphs with topologies that evolve according to the switching dynamics on the composite Markov chain described in this section. The present disclosure demonstrates that under the opinion fusion scheme described herein, all the robots 102 will reach a consensus on the feature distribution.

The dynamics of movements of the plurality of robots 102 on the spatial grid can be modeled by a composite Markov chain with states $$Y_k = (Y_k^1, Y_k^2, \dots, Y_k^N) \in \mathcal{M},$$

where $M = S^{\mathcal{A}}$. Note that $S = |S|$ and $\mathcal{M} = S^N$. An undirected graph $\hat{\mathcal{G}} = (\hat{\nu}, \hat{\varepsilon})$ is defined that is associated with the composite Markov chain. The vertex set $\hat{\nu}$ is the set of all possible realizations $\hat{i} \in \mathcal{M}$ of $Y_k$. The notation $\hat{i}(a)$ represents the $a^{th}$ entry of $\hat{i}$, which is the node $i \in S$ occupied by robot a. The edge set $\hat{\varepsilon}$ is defined as follows: $(\hat{i}, \hat{j}) \in \hat{\varepsilon}$ if and only if $(\hat{i}(a), \hat{j}(a)) \in \varepsilon_s$ for all robots $a \in \mathcal{N}$. Let $Q \in \mathbb{R}^{|\mathcal{M}| \times |\mathcal{M}|}$ be the state transition matrix associated with the composite Markov chain. The elements of Q, denoted by $q_{\hat{i}\hat{j}}$, are computed from the transition probabilities defined in (14) as follows:

$$q_{\hat{i}\hat{j}} = \prod_{a=1}^{N} p_{\hat{i}(a)\hat{j}(a)}, \quad \forall \hat{i}, \hat{j} \in \mathcal{M}, \quad (16)$$

Here $q_{\hat{i}\hat{j}}$ is the probability that in the next time step, each robot a will move from node $\hat{i}(a)$ to node $\hat{j}(a)$.

Figures 2, 3:
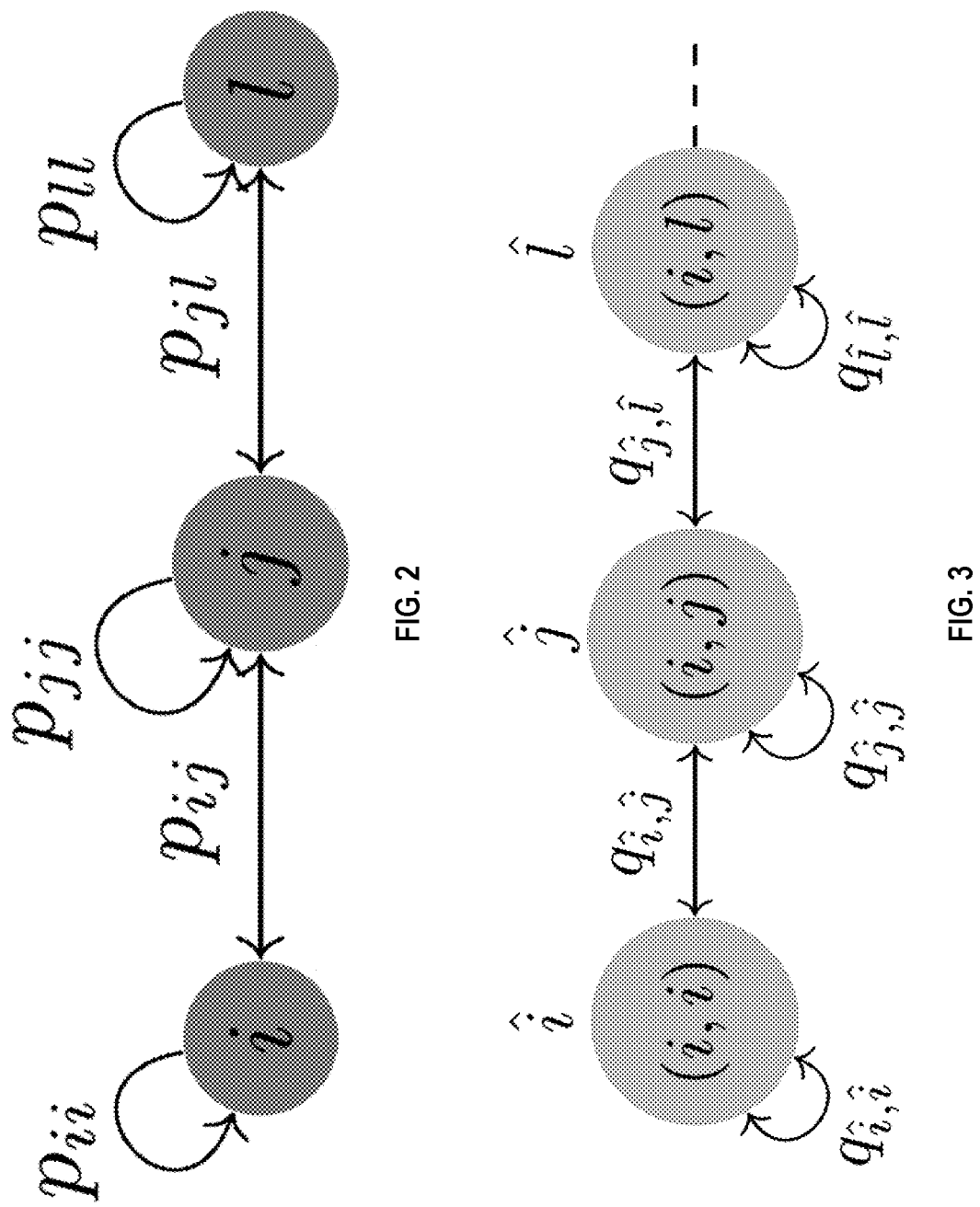
FIG. 2 is a graphical representation showing a state diagram of the multi-robot system of FIG. 1B following the strategy of FIG. 1A where the arrows signify undirected edges between pairs of distinct nodes and self-edges of a graph representative of an environment.
FIG. 3 is a graphical representation showing a subset of a composite graph for two robots that move according to the graph of FIG. 2.

For example, consider a set of two robots, $\mathcal{N} = \{1,2\}$ that move on the graph $\mathcal{G}_s$ in FIG. 2. In the next time step, the robots can stay at their current node or travel between nodes i and j and between nodes j and l, but they cannot travel between nodes i and l. FIG. 3 shows a subset of the resulting composite graph $\hat{\mathcal{G}}$, whose entire set of nodes is $\hat{V} = \{(i,i), (i,j), (i,l), (j,i), (j,j), (j,l), (l,i), (l,j), (l,l)\}$. Each node in $\hat{V}$ is labeled by an index $\hat{i}$, e.g., $\hat{i}=(i,j)$, with $\hat{i}(1)=i$ and $\hat{i}(2)=j$. Given the connectivity of the spatial grid defined by $\varepsilon_s$, one can for example identify $((i,j), (i, l))$ as an edge in $\hat{\varepsilon}$, but not $((i,j),(l, l))$. Since $\mathcal{N} =2$ and $S =3$, then $|\mathcal{N}|=3^2=9$. For each $\hat{i}, \hat{j} \in \hat{\nu}$, transition probabilities in $Q \in \mathbb{R}^{9 \times 9}$ can be determined from Eq. (16) as follows:

$$q_{\hat{i}\hat{j}} = Pr(Y_{k+1} = \hat{j} | Y_k = \hat{i}) = p_{\hat{i}(1)\hat{j}(1)} p_{\hat{i}(2)\hat{j}(2)}, k \in \mathbb{Z}_+ \quad (17)$$

The following discussion proves that all robots will reach consensus on the feature distribution and it will converge to the reference distribution.

Theorem IV-A: Consider a group of N robots, moving on a finite spatial grid with DTDS Markov chain dynamics (1), that update their opinions $$f_k^a(s)$$

for the feature distribution on the grid according to Eqs. (3), (7), (9) and (10). Then for each robot $a \in \mathcal{A}$, $$f_k^a(s)$$

will converge to $f^{ref}(s)$ as $k \to \infty$ almost surely.

Proof: Suppose at initial time k, the locations of the robots on the spatial grid are given by the node $\hat{i} \in \hat{\mathcal{P}}$. Consider another set of robot locations at a future time $k_0+k$, given by the node $\hat{j} \in \hat{\mathcal{P}}$. The transition of the robots from configuration $\hat{i}$ to configuration $\hat{j}$ in k time steps corresponds to a random walk of length k on the composite Markov chain $Y_k$ from node $\hat{i}$ to node $\hat{j}$. It also corresponds to a random walk by each robot a on the spatial grid from node $\hat{i}(a)$ to node $\hat{j}(a)$ in k time steps. By construction, the graph $\mathcal{G}_s$ is strongly connected and each of its nodes has a self-edge. Thus, there exists a discrete time $n>0$ such that, for each robot a, there exists a random walk on the spatial grid from node $\hat{i}(a)$ to node $\hat{j}(a)$ in n time steps. Consequently, there always exists a random walk of length n on the composite Markov chain $Y_k$ from node i to node j, and therefore $Y_k$ is an irreducible Markov chain. All states of an irreducible Markov chain belong to a single communication class. In this case, all states are positive recurrent; as a result, each state of $Y_k$ is visited infinitely often by the group of robots. Moreover, because the composite Markov chain is irreducible, it can be concluded that $\cup_{k \in \mathbb{Z}_{\geq 0}} \mathcal{G}_c[k] = \mathcal{G}_0$, where $\mathcal{G}_0$ is the complete graph on the set of robots. Therefore, $\mathcal{G}_0$ is strongly connected. Hence, each robot will meet every other robot at some node $s \in \mathcal{S}$ infinitely often. Since $Y_k$ is irreducible and, $$\theta_k^a(s) \leq \theta_{k+1}^a(s) \leq \theta^{ref}(s), \forall\, a \in \mathcal{A}, \forall\, s \in \mathcal{S}, \qquad \text{Eq. (10)}$$

it follows from Eqs. (9) and (10) that $$\theta_k^a(s) \to \theta^{ref}(s) \text{ as } k \to \infty.$$

Consequently, $$f_k^a(s) \to f^{ref}(s) \text{ as } k \to \infty$$

almost surely.

V. Numerical Simulation Results

The numerical simulations model a set of robots $\mathcal{A} = \{1, 2, 3, 4\}$ moving on a 5.6 m×5.6 m domain that is discretized into a square grid with c=8 nodes on each side, with a distance $\delta = 0.7$ m between adjacent nodes. The robots switch from one node to another at each time step according to the Markov chain dynamics in (1). The state transition probabilities $p_{ij}, i, j \in \mathcal{S} = \{1, 2, \ldots, c^2\}$, that are associated with the spatial graph $\mathcal{G}_s$ are computed from Eq. (14). The value $\hat{l}=0.8$ in Eq. (2) is set for both the numerical and Software-In-The-Loop simulations. The features are distributed on the set of nodes $\mathcal{B}^r = \{19, 20, 21, 26, 30, 34, 38, 42, 46, 51, 52, 53\}$, which represents a discrete approximation of a circular distribution on the grid. The set of neighbors $N_k^a$ of robot a at time k includes all robots that are located at the same node as robot a at that time.

Figure 6:
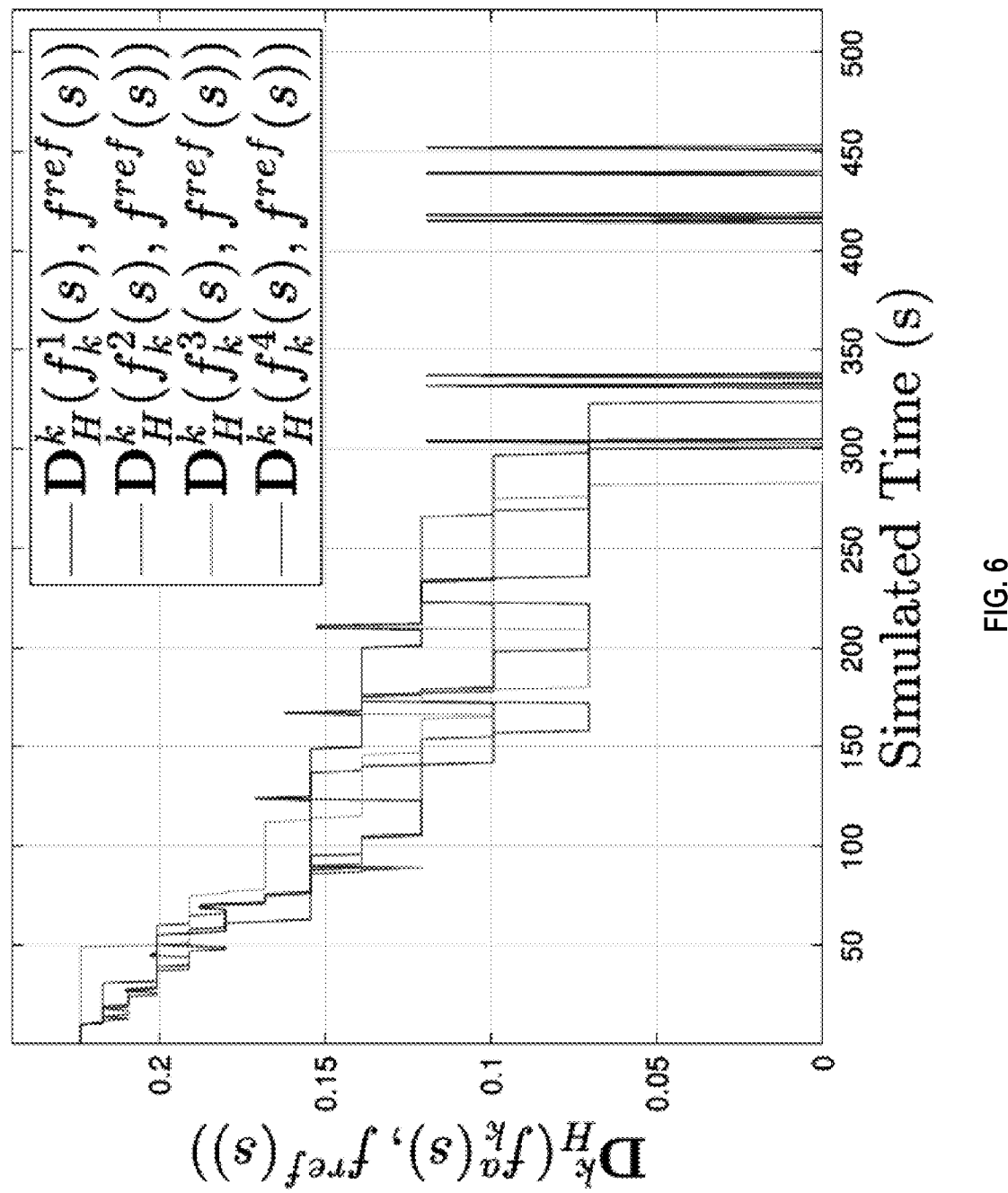
FIG. 6 is a graphical representation showing time evolution of Hellinger distance for each robot a∈{1, 2, 3, 4} in the numerical simulation.
Figure 7:
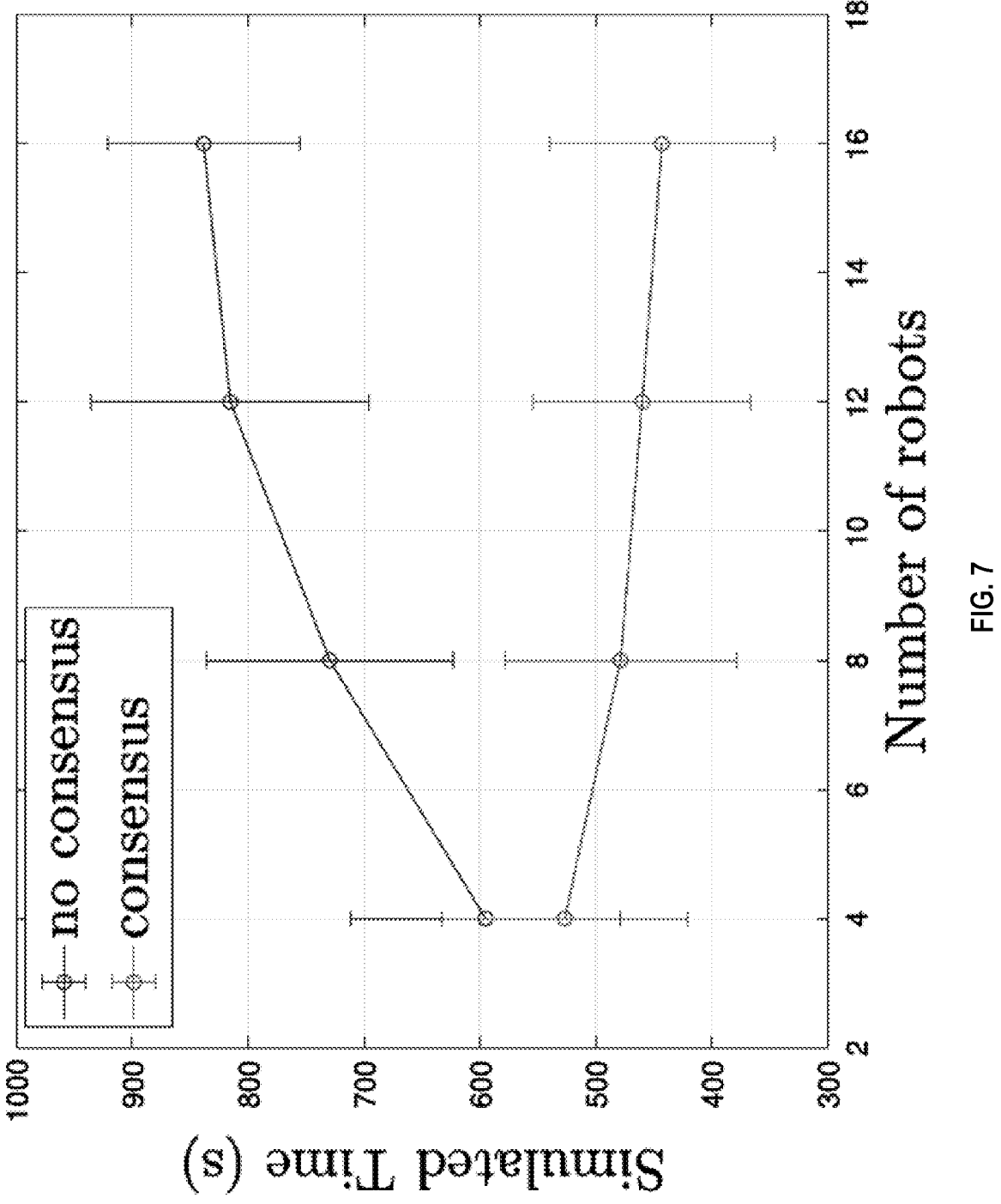
FIG. 7 is a graphical representation showing time until convergence of robots' feature PMFs to the reference PMF in numerical simulations of the feature reconstruction strategy with and without consensus, for N={4, 8, 12, 16} robots.

All robots are initialized at uniformly random nodes in $\mathcal{S}$. Prior to exploration, the robots assume that all the grid nodes are unoccupied by features, and hence the vector of Hellinger distances is initially $D_H = 0 \in \mathbb{R}^{N \times 1}$. During their exploration of the grid, when robots encounter each other at the same node, they exchange their current feature PMFs and fuse them according to Eq. (7). FIGS. 4A-5D show the feature PMFs computed by each robot at k=240 s (for FIGS. 4A-4D) and k=500 s (for FIGS. 5A-5D). FIGS. 4A-4D show that by k=240 s, all robots have partially reconstructed the feature PMF, with robot 4 (FIG. 4D) having the closest reconstruction as measured by $$D_H\left(f_{240}^4(s), f^{ref}(s)\right) \approx 0.07$$

in FIG. 7. FIGS. 5A-5D show that all robots have successfully reconstructed the feature PMF by k=500 S. The robots' consensus on the reference PMF is also apparent from FIG. 6, which shows that all Hellinger distances are zero at that time. Several distances $$D_H\left(f_k^a(s), f^{ref}(s)\right)$$

increase at times k between 400 s and 500 s, due to the numerical inaccuracies in the fusion.

Monte Carlo numerical simulations were also conducted with different numbers of robots, N={4, 8, 12, 16}, to investigate the effect of N and the effect of consensus on the performance of the strategy in terms of the time for all robots' feature PMFs to converge to the reference PMF. FIG. 7 plots the resulting time, averaged over 100 simulations (error bars show standard deviations), until the feature PMFs of all N robots converge to the reference PMF in the consensus and no-consensus cases. FIG. 7 shows that for N=4 robots, the mean time until convergence for both the consensus and no-consensus strategies are similar, with a significant overlap in their standard deviations. This indicates that for small numbers of robots, both strategies perform similarly. However, as N increases, there is a widening gap between the mean times until convergence of the consensus and no-consensus strategies, with the times for the strategy with consensus being consistently lower. For N=16 robots, the strategy with consensus is faster than the one without consensus by a factor of ~2 (830 s/438 s).

VI. Software-In-The-Loop Results

Figure 8:
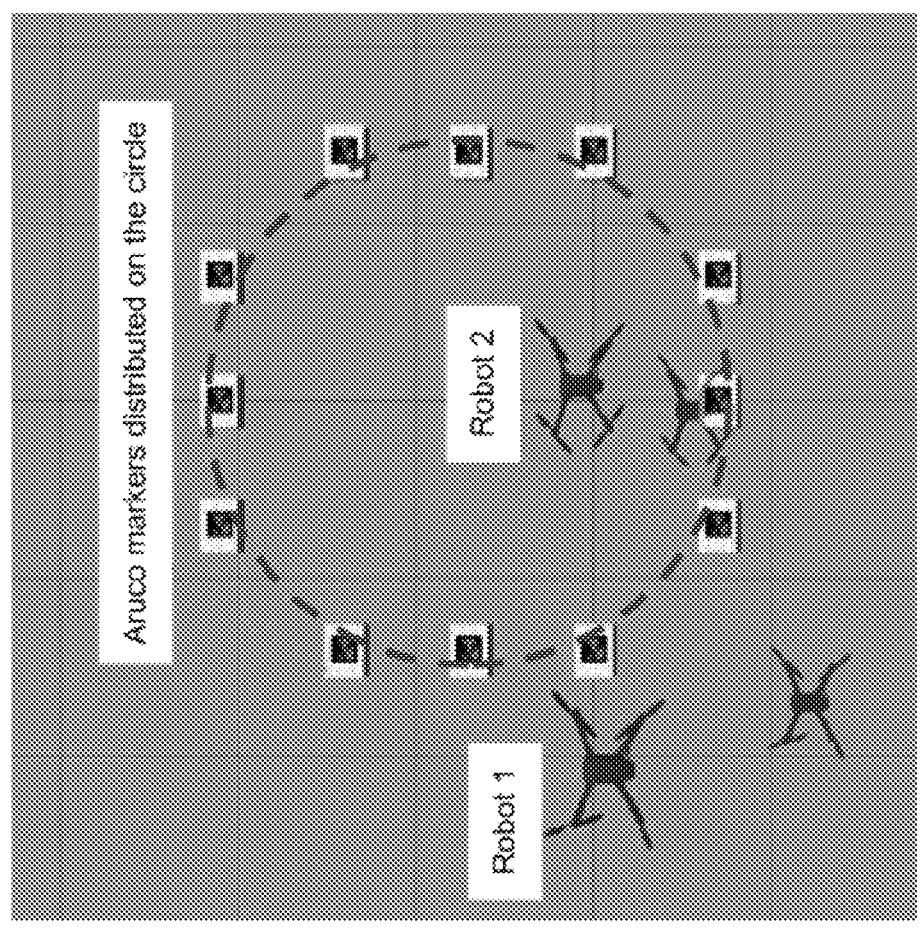
FIG. 8 is a graphical representation showing a Software-In-The-Loop (SITL) setup in Gazebo using the Rotors simulation framework for validation of the multi-robot system of FIG. 1B following the strategy of FIG. 1A.

The present approach is also validated in Software-In-The-Loop (SITL) simulations using Gazebo and ROS Melodic. The same scenario is simulated as in the numerical simulations, with the set of robots consisting of two quadrotors, Robot 1 and Robot 2. FIG. 8 illustrates the simulation setup. The quadrotors are simulated using the Rotors package in Gazebo, and the PX4 flight control stack is implemented in SITL to execute all low-level control tasks for each quadrotor. The discrete feature distribution that the quadrotors must reconstruct is represented by the ArUco markers on the ground plane, located at positions along the red dotted circle. The quadrotors fly at different altitudes (1 m and 2 m) to avoid collisions. This eliminates the need for obstacle detection and avoidance strategies, which are beyond the scope of this work. To detect the ArUco markers, each quadrotor is equipped with a simulated VGA resolution RGB camera that takes images at 30 fps and is oriented to face the ground plane. The image window size is heuristically adjusted to account for the difference in perspective resulting from the robots' difference in altitude. The quadrotors are assigned static IP addresses and exchange their feature distributions over wireless communication when they meet at the x, y position of the same node (at different altitudes). T=550 s was selected as the final time of the simulations.

A. System Architecture

Figure 9:
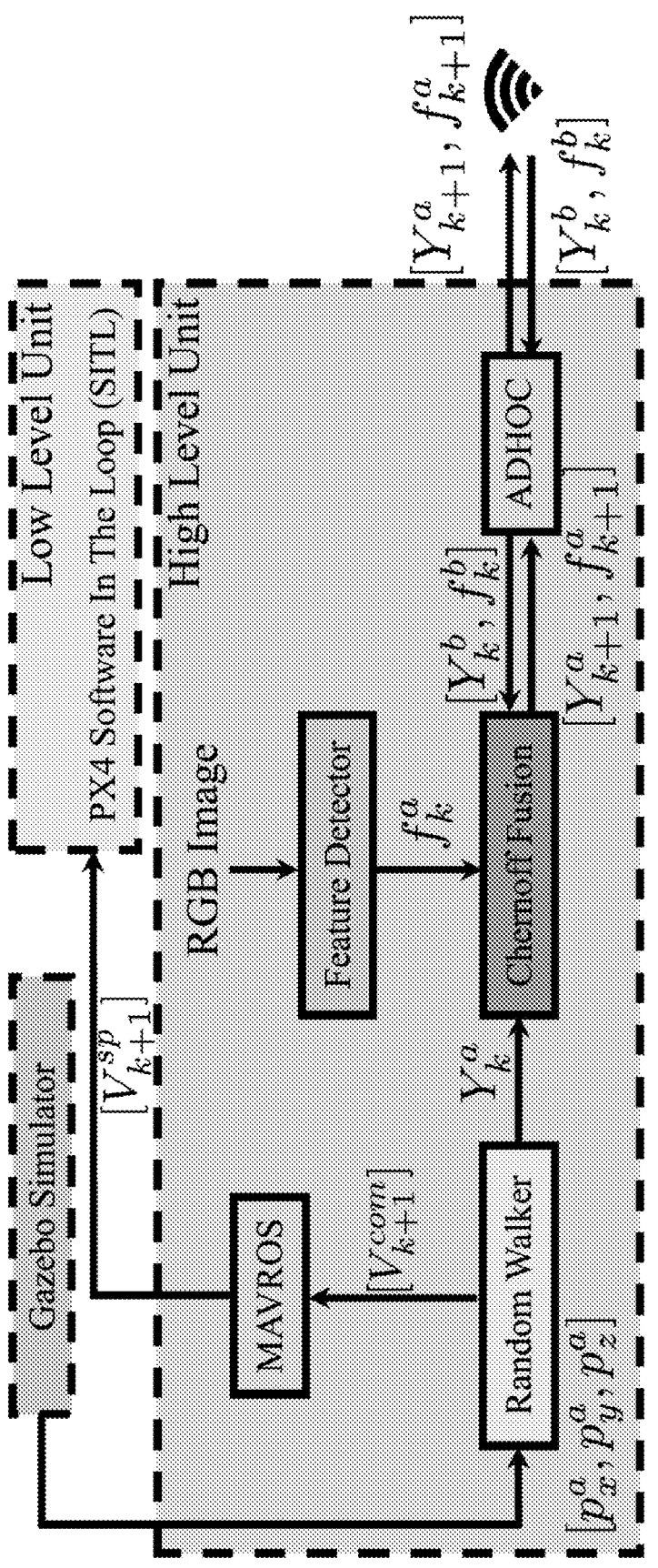
FIG. 9 is a schematic block diagram showing a SITL simulation system architecture for validation of the strategy of FIG. 1A, FIGS. 10A and 10B are a pair of graphical representations showing feature PMFs of 2 robots at time k=240 s in a first run of the SITL simulation.

A diagram of an example system architecture of a robot 102 of the system 100 is shown in FIG. 9 and uses a hierarchical control scheme including low-level and high-level control blocks. The following is a description of each block in FIG. 9 that was implemented for the validation studies herein. The low-level controllers (Low Level Unit) use the ROS package MAVROS to generate the control commands for the simulated robots (in this implementation, the robots are quadrotors) from the high-level controller (High Level Unit). Gazebo provides global localization for the simulated quadrotors. It outputs the 3D position of each robot $$a, \left[p_x^a, p_y^a, p_z^a\right],$$

and its orientation. The 3D quadrotor positions from Gazebo are used to determine the quadrotors' current nodes on the grid and the nodes they should move to in the next time step, according to the DTDS Markov chain in (1). The new node locations are mapped to the commanded quadrotor velocities at time $$k + 1, V_{com}^{k+1},$$

which are converted by MAVROS into velocity set points $$V_{sp}^{k+1}$$

and sent to the Low Level Unit. This block performs the corrections to the quadrotors' poses, which are rendered in Gazebo. An RGB image from the quadrotor's bottom-facing camera is used to detect an ArUco marker at the quadrotor's current node, and the feature PMF $$f_k^a(s)$$

is computed according to Eq. (3). When two quadrotors are located at the same node, they exchange their feature PMFs using ZeroMQ. Chernoff Fusion block executes the fusion protocol in Algorithm 1. It computes the quadrotor's feature PMF from its own measurements and from the feature PMFs transmitted by other quadrotors at its current node through the ADHOC block.

B. Simulation Results

Figures 10A, 10B:
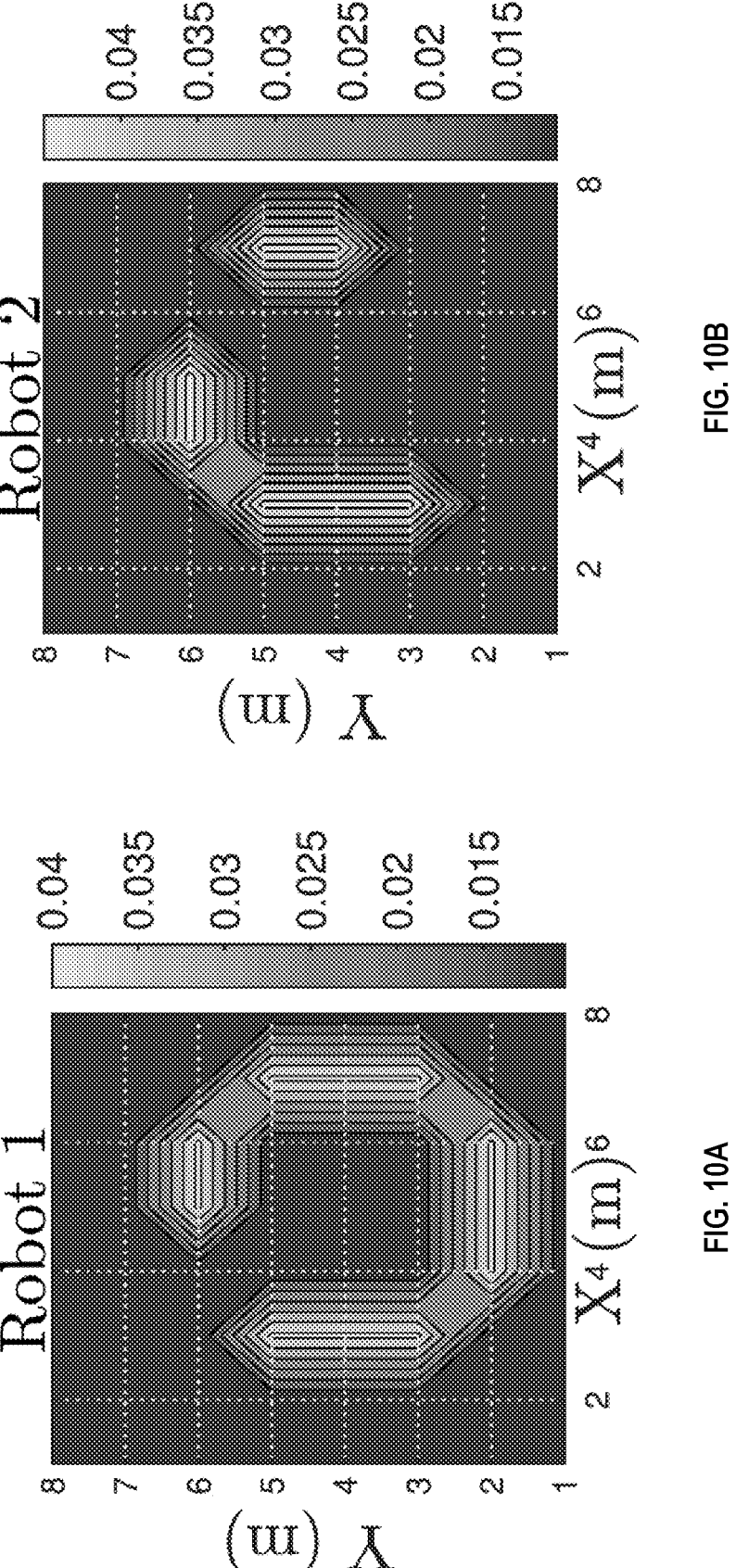
Figures 11A, 11B:
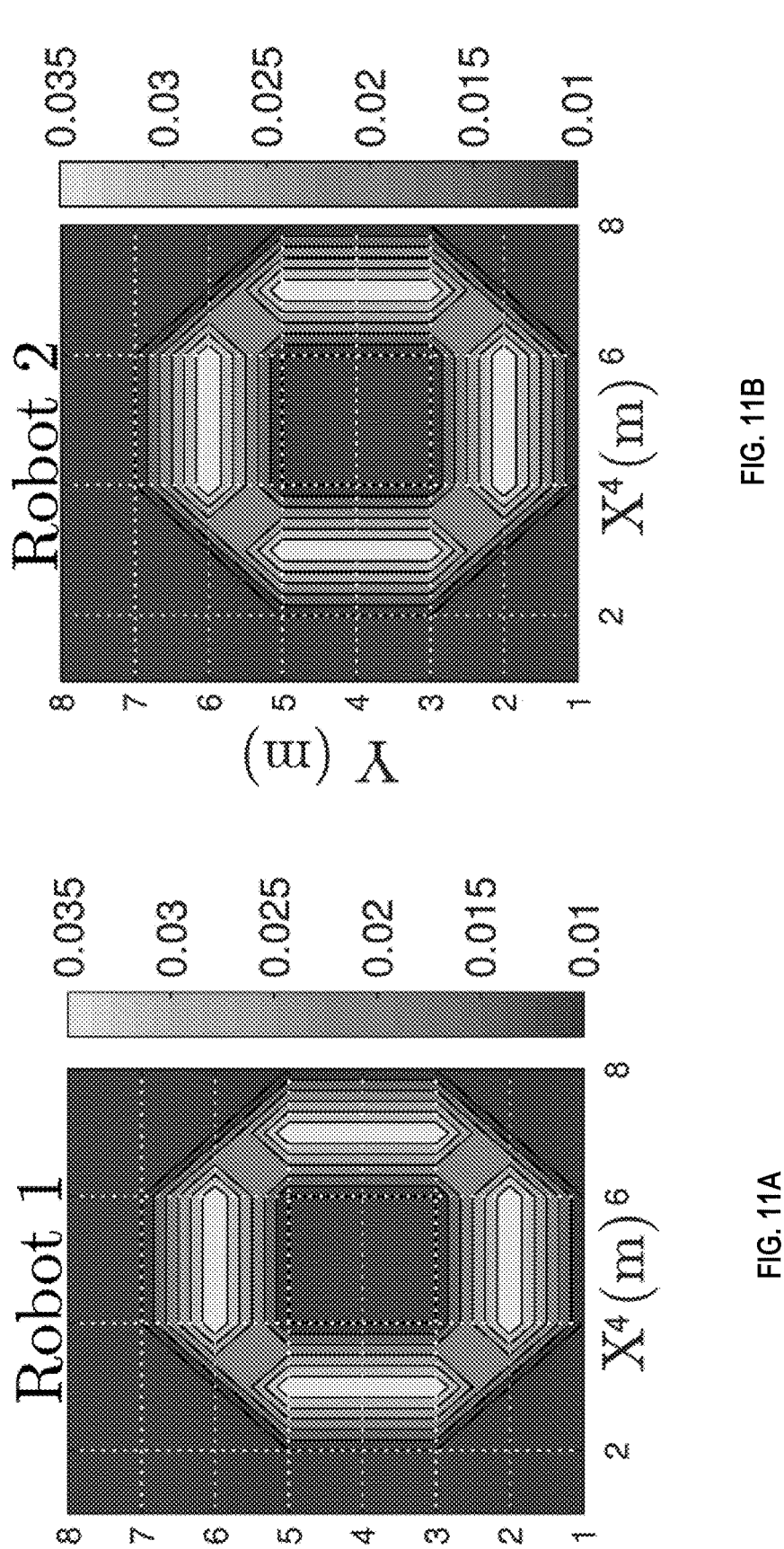
FIGS. 11A and 11B are a pair of graphical representations showing feature PMFs of 2 robots at time k=330 s in a first run of the SITL simulation.

FIGS. 10A-13B plot the feature PMFs computed by both quadrotors during two SITL simulation runs. FIGS. 10A and 10B show the feature PMFs at k=240 s (4 min) and FIGS. 11A and 11B show the feature PMFs at k=330 s (5.5 min), of the first simulation run. The figures indicate that Robot 1 reconstructs most of the feature distribution within 4 min, and both robots fully reconstruct the distribution within 5.5 min.

Figure 12B:
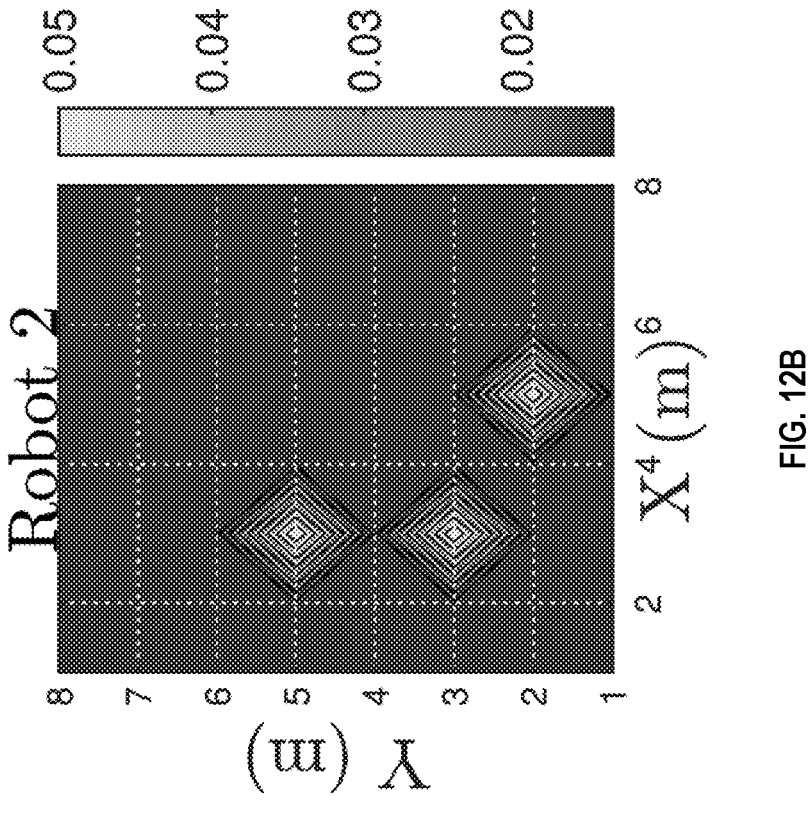
FIGS. 12A and 12B are a pair of graphical representations showing feature PMFs of 2 robots at time k=240 s in a second run of the SITL simulation.
Figure 12A:
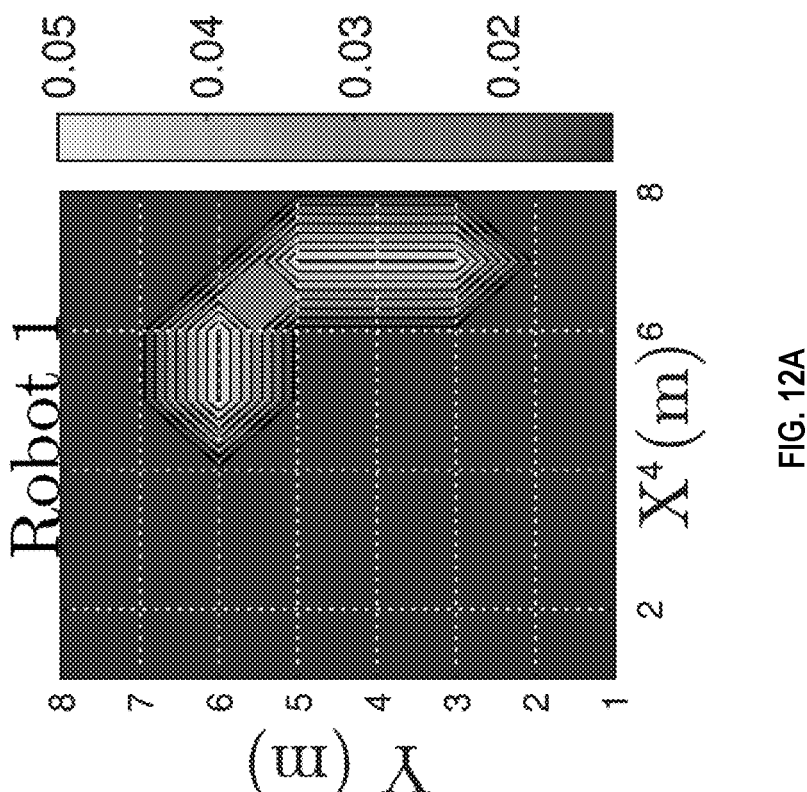
Figures 13A, 13B:
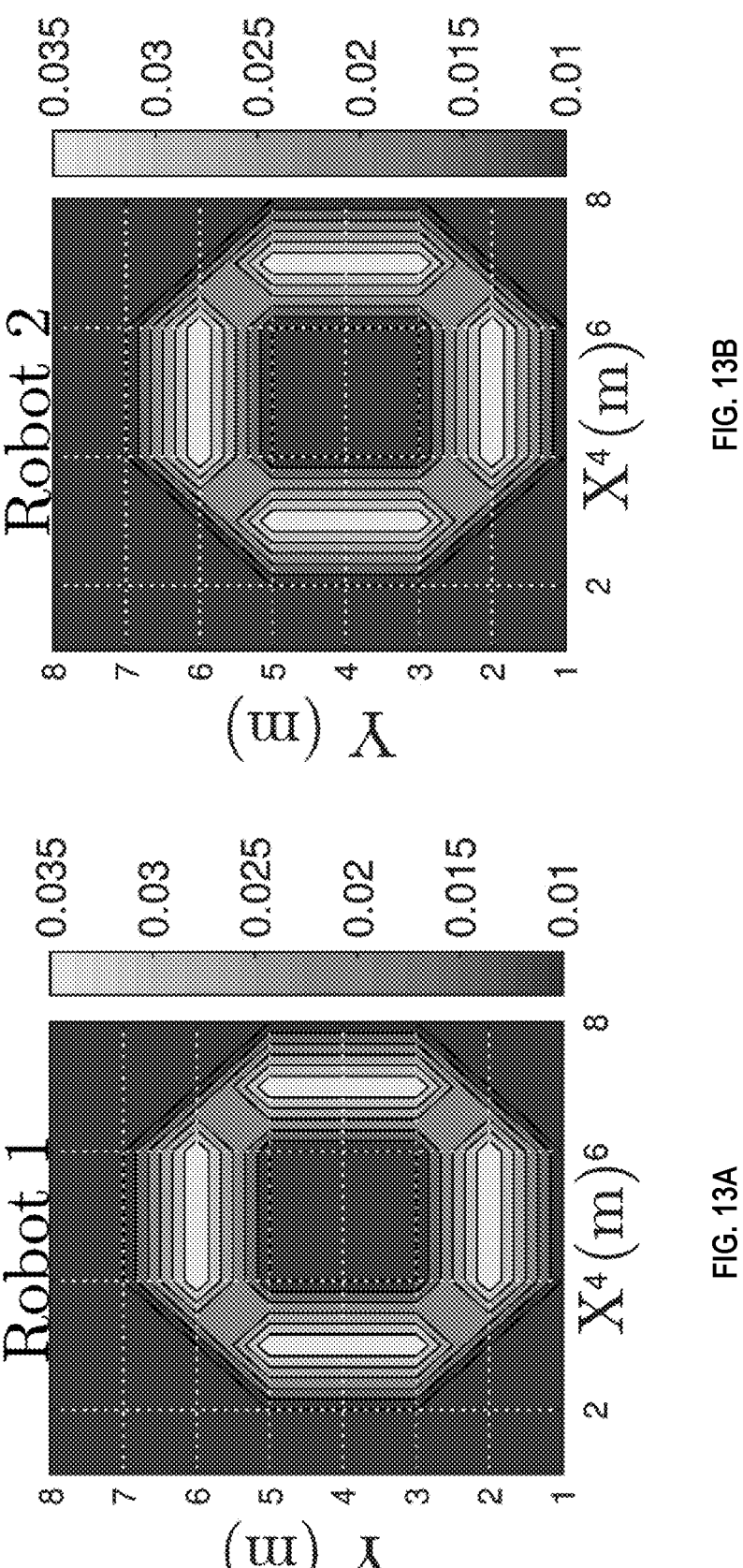
FIGS. 13A and 13B are a pair of graphical representations showing feature PMFs of 2 robots at time k=330 s in a second run of the SITL simulation.

FIGS. 12A-13B plot the feature PMFs at k=240 s (4 min) and k=530 s (~8.8 min), respectively, of the second simulation run. FIGS. 12A and 12B show that in this simulation run, the two robots do not meet and exchange feature PMFs within the first 4 min, since their feature PMFs are completely distinct at that time. By ~8.8 min, FIGS. 13A and 13B show that both robots have fully reconstructed the feature distribution, which matches the reconstructed distribution in FIGS. 11A and 11B. Thus, FIGS. 10A-13B demonstrate that the approach presented herein ultimately results in accurate feature reconstruction, but that the convergence time to full reconstruction can differ between runs due to the randomness in the robot paths over the grid.

C. Considerations for Real-World Implementation

The performance of the present approach in real-world environments will be affected by aerodynamic interactions between quadrotors, uncertainty in positioning, and feature occlusion by a quadrotor that enters another's field of view. In the SITL simulations, it is difficult to accurately simulate the aerodynamic disturbance on a quadrotor caused by the downwash of a quadrotor above it. These disturbances can be rejected by incorporating a robust disturbance observer into the quadrotor's low-level flight control strategy. Alternatively, the quadrotors could fly at the same altitude and employ controllers for inter-robot collision avoidance, e.g. using control barrier functions. Quadrotors may miss feature detections due to misalignment of their camera image window with the ground or to occlusion of the feature by another quadrotor flying below it. Such misalignments and occlusions sometimes occurred in SITL simulations; however, the accuracy of the feature reconstruction despite these occurrences demonstrates the robustness of the present approach to the resulting missed feature detections.

VII. Conclusion and Future Work

In the present disclosure, a decentralized multi-robot strategy for reconstructing a discrete feature distribution on a finite spatial grid is presented. Robots update their estimate of the feature distribution using their own measurements during random-walk exploration and estimates from nearby robots, combined using a distributed Chernoff fusion protocol. The strategy described herein extends established results on consensus of opinion pools for fixed, strongly connected networks to networks with Markovian switching dynamics. The present disclosure provides theoretical guarantees on convergence to the ground truth feature distribution in an almost sure sense, and further provides validation of the strategy in both numerical simulations and SITL simulations with quadrotors.

Note that the strategy is agnostic to the source of the information used to reconstruct the feature distribution; it values the information gained from exploration and other robots equally. This can result in suboptimal convergence rates to consensus on the ground truth distribution, potentially exceeding the operational flight times of small aerial robots with limited battery life. To increase the convergence rate to consensus, the exploration strategy can be modified from unbiased random walks to random walks that are biased in directions that increase information gain from individual robots' on-board sensor measurements and also ensure frequent encounters between robots. Another possible way to decrease the time to consensus is by relaxing the constraint $r_{comm}<0.5\delta$, allowing robots to communicate with robots at other nodes. This would require an analysis of whether consensus is still ensured by reformulating the composite Markov chain and determining whether it is irreducible and positive recurrent. In addition, while Pólya's recurrence theorem guarantees that the obtained results on irreducibility and positive recurrence do not extend to random walks on infinite 3D lattices, it would be interesting to investigate whether they are valid for finite 3D grids. Finally, it would be useful to derive an analytical formulation of the expected time until consensus, if possible, which would provide a more rigorous basis for selecting the final time T.

VIII. Methods

FIGS. 14A and 14B show a decentralized consensus-based method 200 for determining a discrete feature distribution by the system 100 outlined above with reference to FIGS. 1A-1C. In particular, the method 200 detailed within this section can be implemented at a processor of the first robot 102A of the plurality of robots 102. Note that while the steps of method 200 discussed in this section pertain to the first robot 102A, method 200 can be simultaneously implemented at respective processors of other robots, e.g., second robot 102B, third robot 102C . . . n-th robot 102n.

Referring to FIG. 14A, with additional reference to FIGS. 1A-1C, step 202 of method 200 includes accessing sensor information (e.g., sensor data shown in FIG. 1B) from a sensor (e.g., sensor(s) 140) of the first robot 102A positioned at a first node within an area for a time step k.

At an initial time step where the first robot 102A has yet to observe features within the area, the first feature opinion information for when k=0 can be nominal according to equation (5) herein with the plurality of robots 102 assuming a priori that the grid is empty. However, in some embodiments, the plurality of robots 102 may be presented with initial information about the feature distribution and the first feature opinion information for when k=0 can reflect the initial information.

Step 204 of method 200 includes updating, based on the sensor information for the first node, first feature opinion information associated with the first robot 102A for the time step. The first robot 102A uses the sensor information to estimate a feature distribution of a subset of the area associated with the first node. The feature distribution can include an occupancy vector (equation (2)) expressive of an estimate of nodes of the area that are occupied by features, and may be in the form of a feature probability mass function (or "occupancy distribution") (equation (3)). The first robot 102A can incorporate the estimated feature distribution into the first feature opinion information such that the first feature opinion information includes observations held by the first robot 102A up to the time step k. In the example implementation of FIG. 9, the sensor information can include an image (e.g., RGB image) taken by an image capture device (e.g., of sensor(s) 140) of the first robot 102A. However, in other examples, the sensor(s) 140 of each robot 102 can employ other modalities for feature detection, including but not limited to: sonar, temperature, electromagnetism, and motion detection. For multi-modal implementations of the system 100, each robot 102 can combine sensor information for inclusion within the feature opinion information held by the robot 102.

Step 206 of method 200 includes establishing, at the processor of the first robot 102A, a communication link (e.g., communication link 110 of FIG. 1B) between the first robot 102A and the second robot 102B, the second robot 102B being within a communication range of the first robot 102A. In some examples, the first robot 102A and the second robot 102B are both positioned at the first node. However, in some examples, the communication range may be extended to neighboring nodes that may be occupied by the second robot 102B. The communication link 110 can be established and maintained between the first robot 102A and the second robot 102B over a suitable wireless protocol such as but not limited to Bluetooth®, Wi-Fi, LTE, etc. In some examples, the communication link 110 may be transient in that once the first robot 102A or the second robot 102B moves out of range, the communication link 110 may be terminated. Step 206 can also include steps involved in discovery of the second robot 102B and other robots that may be within range, such as but not limited to probing, pinging, broadcasting/advertising, and requesting connection information to establish the communication link 110.

Step 208 of method 200 includes sending, by the processor and over the network interface of the first robot 102A, the first feature opinion information to the second robot 102B. Likewise, the first robot 102A receives second feature opinion information from the second robot 102B. Step 210 of method 200 includes accessing, at the processor of the first robot 102A, the second feature opinion information received from the second robot 102B over a network interface (e.g., through the communication link 110) of the first robot 102A.

Step 212 of method 200 includes applying, at the processor of the first robot 102A, a distributed Chernoff fusion protocol (e.g., Algorithm 1, equations (7)-(10)) for fusion of the first feature opinion information with the second feature opinion information. In some examples, step 212 can further include assigning a weight value for fusion of the first feature opinion information with the second feature opinion information based on a position of the first robot 102A and a position of the second robot 102B (see equation (6) and Algorithm 1). FIG. 14A concludes at circle A, and the method 200 continues at circle A of FIG. 14B.

Step 214 of method 200 includes generating, at the processor of the first robot 102A, fused feature opinion information for a subsequent time step (e.g., k+1) by fusion of the first feature opinion information with the second feature opinion information according to the distributed Chernoff fusion protocol of Algorithm 1 and equations (7)-(10)). Step 216 of method 200 includes updating, at the processor of the first robot 102A, the first feature opinion information for the subsequent time step based on the second feature opinion information using the fused feature opinion information for the subsequent time step (equations 8, 9 and 10).

Steps 218 and 220 of method 200 are directed to the Markovian random walk performed by each respective robot 102. Step 218 of method 200 includes selecting, based on a position of the first robot, a second node within the area according to a Markovian random walk (e.g., a discrete-time discrete-state Markov motion model). Step 220 of method 200 includes generating one or more control signals for application to a mobility assembly of the first robot that direct the first robot towards the second node. The processes outlined in method 200 can be repeated as needed until time T, with information exchange between individual robots 102 occurring in an ad-hoc manner.

Further, the various steps of method 200 can be extended as needed to incorporate a third robot 102C that might be within range of the first robot 102A and the second robot 102B for information exchange. In such a scenario, feature opinion information from additional robots 102 can be fused according to equation (7) herein.

The functions performed in the processes and methods may be implemented in differing order. Furthermore, the outlined steps and operations are provided as examples, and some of the steps and operations may be optional, combined into fewer steps and operations, or expanded into additional steps and operations without detracting from the essence of the disclosed embodiments. Further, the method 200 can include steps directed to providing instructions within a memory that are executable by a processor of a robot (e.g., the first robot 102A) to perform operations corresponding to steps of the method 200 outlined above.

IX. Computer-Implemented System

Figure 15:
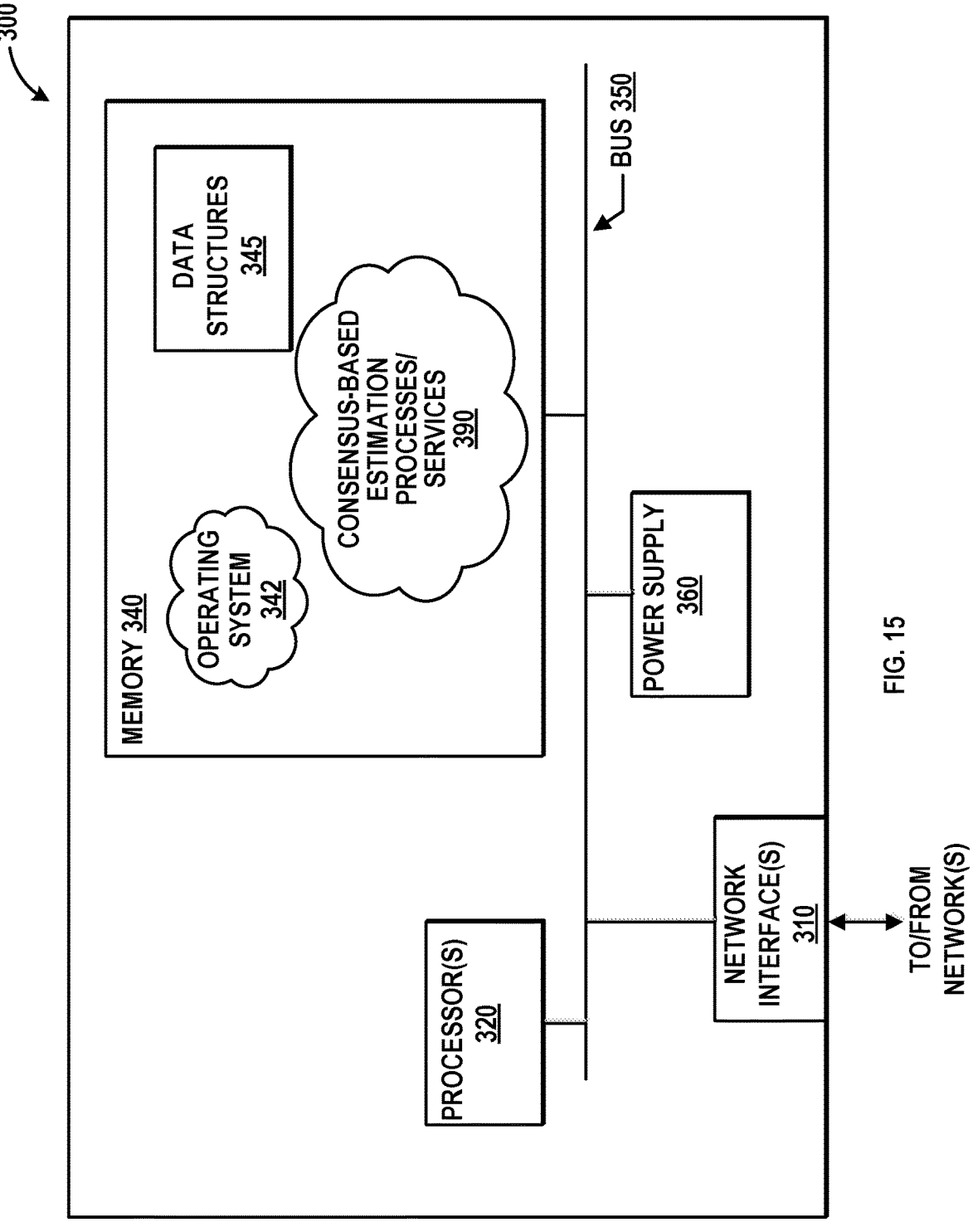
FIG. 15 is a simplified diagram showing an example computing device for implementation of the system of FIGS. 1A-1C, where each robot can include a computing device.

FIG. 15 is a schematic block diagram of an example computing system 300 that may be used with one or more embodiments described herein, e.g., as a component of system 100 as belonging to a robot 102 of the plurality of robots 102 shown in FIGS. 1A-1C. In the embodiment shown in FIG. 1B, the first robot 102A includes the first computing system 300A and the second robot 102B includes the second computing system 300B.

Computing system 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360, however it is appreciated that the interfaces that support PLC protocols may communicate through power supply 360 and/or may be an integral component coupled to power supply 360.

Memory 340 includes a plurality of storage locations that are addressable by processor 320 and network interfaces 310 for storing software programs and data structures associated with the embodiments described herein. In some embodiments, computing system 300 may have limited memory or no memory (e.g., no memory for storage other than for programs/processes operating on the device and associated caches).

Processor 320 comprises hardware elements or logic adapted to execute the software programs (e.g., instructions) and manipulate data structures 345. An operating system 342, portions of which are typically resident in memory 340 and executed by the processor, functionally organizes computing system 300 by, inter alia, invoking operations in support of software processes and/or services executing on the device. These software processes and/or services may include consensus-based estimation processes/services 390, which can include aspects of the methods described herein and/or implementations of various modules described herein. Note that while consensus-based estimation processes/services 390 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the consensus-based estimation processes/services 390 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:

a first robot having a processor in communication with a sensor and a memory, the memory including instructions executable by the processor to:

access sensor information from the sensor of the first robot, including a first time-step index and a grid-node identifier that denotes a first grid-node of a spatial grid indexed by grid-node identifiers, the first grid-node corresponding to a location of the first robot during capture of the sensor information;

update an occupancy vector over the spatial grid by setting an entry indexed by the grid-node identifier to an occupancy value indicative of a local detection outcome at the first grid-node;

generate, for the first time-step index, first feature opinion information-associated by normalizing the occupancy vector to obtain a first occupancy distribution over the grid-node identifiers;

access second feature opinion information from a second robot over a local inter-robot network interface when the first robot and the second robot are co-located at the first grid-node, the second feature opinion information comprising a second occupancy distribution over the grid-node identifiers;

generate a fused occupancy distribution by weighted element-wise combination of the first occupancy distribution and the second occupancy distribution; and update the first feature opinion information for a subsequent time step based on the fused occupancy distribution.

2. The system of claim 1, wherein the weighted element-wise combination comprises a weighted multiplicative pooling of corresponding probability values from the first occupancy distribution and the second occupancy distribution, followed by normalization.

3. The system of claim 2, the memory further including instructions executable by the processor to:

assign a weight value used in the weighted element-wise combination based on or more characteristics of a neighbor set of two or more robots co-located at the first grid-node at a time of receipt.

4. The system of claim 1, the sensor including an image capture device and the sensor information including an image captured by the image capture device.

5. The system of claim 1, the memory further including instructions executable by the processor to:

select, based on a position of the first robot, a second grid-node along the spatial grid according to a Markovian random walk.

6. The system of claim 5, where selection of the second grid-node is achieved using a discrete-time discrete-state Markov motion model.

7. The system of claim 5, the memory further including instructions executable by the processor to:

generate one or more control signals for application to a mobility assembly of the first robot that direct the first robot towards the second grid-node.

8. The system of claim 1, the memory further including instructions executable by the processor to:

access, at the processor of the first robot, third feature opinion information from a third robot via the local inter-robot network interface when the first robot and the third robot are co-located at the first grid-node, the third feature opinion information comprising a third occupancy distribution over the grid-node identifiers; and update the fused occupancy distribution by weighted element-wise combination of the first occupancy distribution, the second occupancy distribution, and the third occupancy distribution followed by normalization.

9. A method, comprising:

accessing, at a processor of a first robot in communication with a memory, sensor information from a sensor of a first robot, including a first time-step index and a grid-node identifier that denotes a first grid-node of a spatial grid indexed by grid-node identifiers, the first grid-node corresponding to a location of the first robot during capture of the sensor information;

updating an occupancy vector over the spatial grid by setting an entry indexed by the grid-node identifier to an occupancy value indicative of a local detection outcome at the first grid-node;

updating generating, for the first time-step index, first feature opinion information by normalizing the occupancy vector to obtain a first occupancy distribution over the grid-node identifiers;

accessing second feature opinion information from a second robot over a local inter-robot network interface when the first robot and the second robot are co-located at the first grid-node, the second feature opinion information comprising a second occupancy distribution over the grid-node identifiers;

generating a fused occupancy distribution by weighted element-wise combination of the first occupancy distribution and the second occupancy distribution; and updating the first feature opinion information for a subsequent time step based on the fused occupancy distribution.

10. The method of claim 9, wherein the weighted element-wise combination comprises a weighted multiplicative pooling of corresponding probability values from the first occupancy distribution and the second occupancy distribution, followed by normalization.

11. The method of claim 9, further comprising:

selecting, based on a position of the first robot, a second grid-node along the spatial grid according to a Markovian random walk.

12. The method of claim 11, further comprising:

generating, at the processor of the first robot, one or more control signals for application to a mobility assembly of the first robot that direct the first robot towards the second grid-node.

13. The method of claim 9, further comprising:

accessing, at the processor of the first robot, third feature opinion information from a third robot via the local inter-robot network interface when the first robot and the third robot are co-located at the first grid-node, the third feature opinion information comprising a third occupancy distribution over the grid-node identifiers; and updating the fused occupancy distribution by weighted element-wise combination of the first occupancy distribution, the second occupancy distribution, and the third occupancy distribution followed by normalization.

14. A system, comprising:

a plurality of robots, each robot of the plurality of robots being operable for motion within an area according to a Markovian random walk, the plurality of robots including a first robot, the first robot having a processor in communication with a memory, a sensor, and a local inter-robot network interface, the memory including instructions executable by the processor to:

access sensor information from the sensor of the first robot, the sensor information including a time-step index and a grid-node identifier that denotes a first grid-node of a spatial grid indexed by grid-node identifiers, the first grid-node corresponding to a location of the first robot during capture of the sensor information;

update an occupancy vector over the spatial grid by setting an entry indexed by the grid-node identifier to an occupancy value indicative of a local detection outcome at the first grid-node;

generate, for the time-step index, first feature opinion information for the area based on sensor information captured by the first robot along the Markovian random walk by normalizing the occupancy vector to obtain a first occupancy distribution over the grid-node identifiers;

access, via the local inter-robot network interface and when the first robot and a second robot of the plurality of robots are co-located at the first grid-node, second feature opinion information from the second robot, the second feature opinion information comprising a second occupancy distribution over the grid-node identifiers;

generate a fused occupancy distribution by weighted element-wise combination of the first occupancy distribution and the second occupancy distribution; and update, at the processor of the first robot, the first feature opinion information of the first robot for a subsequent time-step index based on the fused occupancy distribution.

* * * * *